US012612035B2

(12) United States Patent
Agrawal et al.

(10) Patent No.: US 12,612,035 B2
(45) Date of Patent: Apr. 28, 2026

(54) VEHICLE SAFETY SYSTEM

(71) Applicant: Zoox, Inc., Foster City, CA (US)

(72) Inventors: Varun Agrawal, Mountain View, CA (US); Taylor Scott Clawson, Castro Valley, CA (US); Gareth John Ellis, Redwood City, CA (US); Brian Michael Filarsky, San Francisco, CA (US); Giacomo Zavolta Taylor, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 265 days.

(21) Appl. No.: 17/842,469

(22) Filed: Jun. 16, 2022

(65) Prior Publication Data

US 2024/0092350 A1    Mar. 21, 2024

(51) Int. Cl.
B60W 30/09       (2012.01)
B60W 30/095      (2012.01)
B60W 40/04       (2006.01)
B60W 60/00       (2020.01)
G06N 20/00       (2019.01)

(52) U.S. Cl.
CPC ........ B60W 30/09 (2013.01); B60W 30/0956 (2013.01); B60W 40/04 (2013.01); B60W 60/0011 (2020.02); B60W 60/0015 (2020.02); B60W 60/00274 (2020.02);
(Continued)

(58) Field of Classification Search
CPC .. B60W 30/09; B60W 30/0956; B60W 40/04; B60W 60/0011; B60W 60/0015; B60W 60/00274; B60W 2554/4041; B60W 2554/4044; B60W 2554/80; B60W 2554/801; B60W 2554/802; G06N 20/00
See application file for complete search history.

(56) References Cited

U.S. PATENT DOCUMENTS

| | | | | |
|---|---|---|---|---|
| 2018/0061253 A1* | 3/2018 | Hyun | ................... | G08G 1/0175 |
| 2018/0075309 A1* | 3/2018 | Sathyanarayana ... | | G05D 1/0088 |

(Continued)

FOREIGN PATENT DOCUMENTS

| | | |
|---|---|---|
| EP | 3725631 A1 | 5/2023 |
| JP | 2021033536 A | 3/2021 |

OTHER PUBLICATIONS

The PCT Search Report and Written Opinion mailed Sep. 26, 2023 for PCT application No. PCT/US23/68309, 15 pages.

*Primary Examiner* — Nga X Nguyen
(74) *Attorney, Agent, or Firm* — Lee & Hayes, P.C.

(57) ABSTRACT

Techniques for validating or determining trajectories for a vehicle are discussed herein. A trajectory management component can receive status and/or error data from other safety system components and select or otherwise determine safe and valid vehicle trajectories. A perception component of a safety system can validate a trajectory upon which the trajectory management component can wait for selecting a vehicle trajectory, validate trajectories stored in a queue, and/or utilize kinematics for validation of trajectories. A filter component of the safety system can filter out objects based on trajectories stored in a queue. A collision detection component of the safety system can determine the collision states based on trajectories stored in a queue or determine a collision state upon which the trajectory management component can wait for selecting or otherwise determining a vehicle trajectory.

17 Claims, 7 Drawing Sheets

(52) U.S. Cl.
CPC ..... _G06N 20/00_ (2019.01); _B60W 2554/4041_
(2020.02); _B60W 2554/4044_ (2020.02); _B60W_
_2554/80_ (2020.02)

(56) References Cited

U.S. PATENT DOCUMENTS

| | | | |
|---|---|---|---|
| 2018/0141544 A1* | 5/2018 | Xiao .................. | G01C 21/3469 |
| 2019/0179304 A1* | 6/2019 | Iagnemma ......... | B60W 60/0011 |
| 2020/0211394 A1* | 7/2020 | King ................... | B60W 50/023 |
| 2020/0346641 A1* | 11/2020 | Woon .................... | G06V 20/58 |
| 2021/0026359 A1* | 1/2021 | MacGregor .......... | G05D 1/0214 |
| 2021/0403037 A1 | 12/2021 | Horigome et al. | |
| 2022/0194419 A1* | 6/2022 | Houshmand ...... | B60W 60/0023 |

* cited by examiner

100

VEHICLE SAFETY SYSTEM 102

SENSOR DATA 104

TRAJECTORY DATA 106

PERCEPTION COMPONENT 110

116

FILTER COMPONENT 112

118

COLLISION DETECTION COMPONENT 114

120

TRAJECTORY MANAGEMENT COMPONENT 108

CONTROL DATA 122

VALIDATION INFORMATION
PLANNED TRAJECTORY
FIRST SAFE STOP TRAJECTORY
SECOND SAFE STOP TRAJECTORY
N-TH SAFE STOP TRAJECTORY

200

300

400

COLLISION DETECTION
COMPONENT

TRAJECTORY MANAGEMENT
COMPONENT

OPERATE A
COLLISION DETECTION
COMPONENT
402

DETERMINE COLLISION
STATES
404

TRANSMIT A SIGNAL
BASED ON THE
COLLISION STATES
406

No

DETERMINE WHETHER
A SIGNAL IS RECEIVED FROM THE COLLISION
DETECTION COMPONENT
408

YES

VALIDATE
TRAJECTORIES
410

500

PLANNED TRAJECTORY
504

PLANNED TRAJECTORY
506

510

SAFE STOP
TRAJECTORY
508

514

SAFE STOP
TRAJECTORY
512

VEHICLE 502

700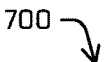

RECEIVE A TRAJECTORY
702

RECEIVE AT LEAST ONE OF A FIRST SIGNAL INDICATIVE OF AN OBJECT PROXIMATE A
VEHICLE, A SECOND SIGNAL INDICATIVE OF PHYSICS BASED COLLISION STATE, OR A
THIRD SIGNAL INDICATIVE OF A MACHINE LEARNED (ML) BASED COLLISION STATE
704

AT LEAST ONE OF THE FIRST SIGNAL,
THE SECOND SIGNAL, OR THE THIRD SIGNAL RECEIVED?
706

NO

YES

DETERMINE TO FOLLOW THE TRAJECTORY OR A SAFE STOP TRAJECTORY
708

FIG. 7

VEHICLE SAFETY SYSTEM

BACKGROUND

Vehicles include various systems that are utilized to guide the vehicles through environments including static and/or dynamic objects. Safety systems can analyze sensor data regarding the environments. The sensor data, such as lidar data, radar data, camera data, etc., can be utilized to determine effects of detected objects on potential actions of the vehicles. Objects encountered within the environments can include dynamic objects that are moving or capable of movement (e.g., vehicles, motorcycles, bicycles, pedestrians, animals, etc.), and/or static objects (e.g., buildings, road surfaces, trees, signs, barriers, parked vehicles, etc.). The vehicles can generate trajectories and utilize the safety systems to ensure the trajectories are safe. The trajectories must be generated in real-time, or near real-time, so that the vehicles can accurately and effectively navigate the environments. The trajectories can be utilized to control the vehicles, taking events surrounding the vehicles into account. The decisions utilized by the vehicle to traverse the environment can be made to ensure safety of passengers in the vehicle and other people or objects in proximity to the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 depicts an example process for operation of a vehicle safety system.

DETAILED DESCRIPTION

Figure 1:
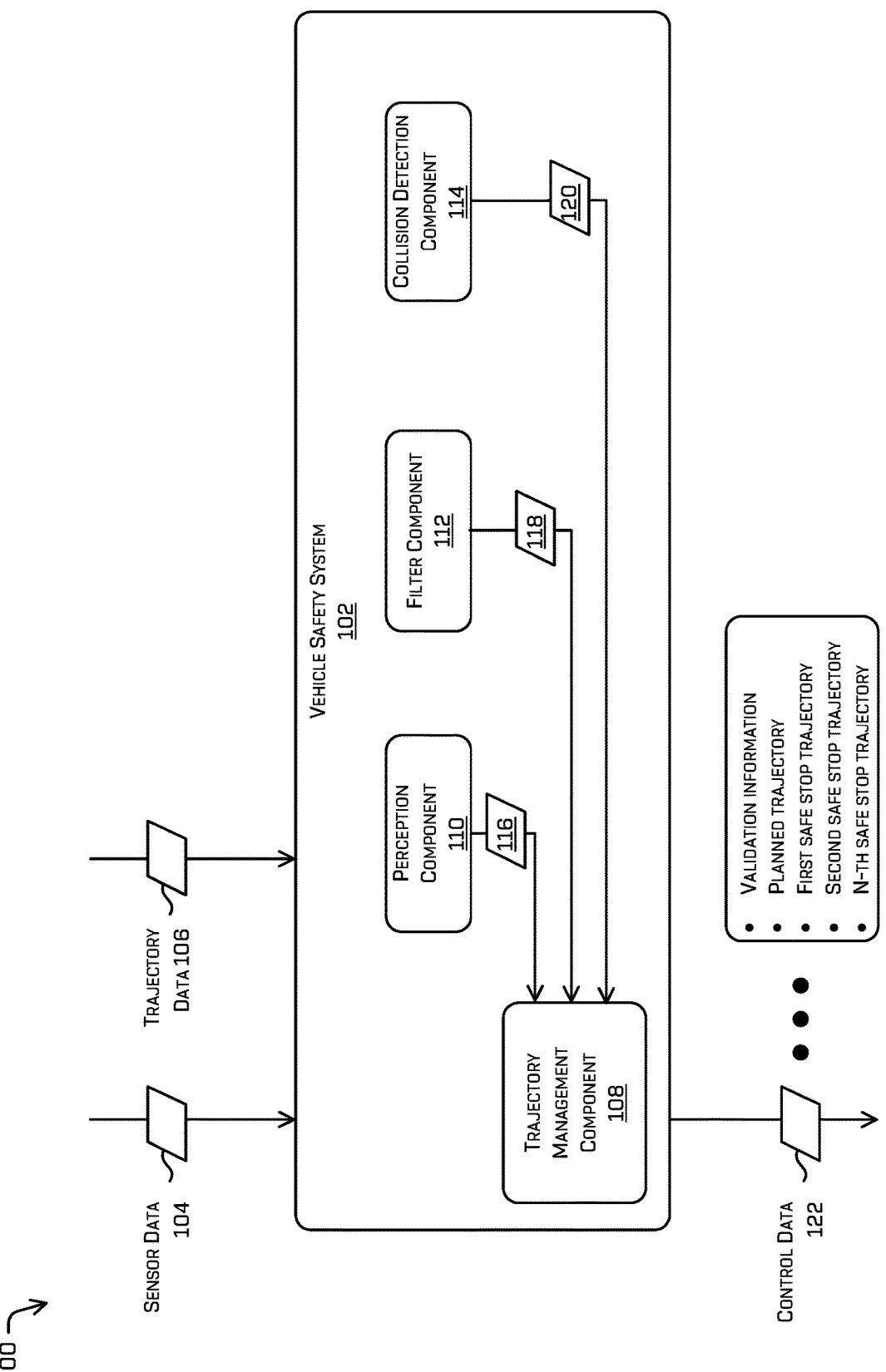
FIG. 1 is a block diagram of an example vehicle system that is included in a vehicle and that includes safety system components, in accordance with examples of the disclosure.

Techniques for validating or determining trajectories for a vehicle are discussed herein. In some examples, collision avoidance for a vehicle may comprise a system (or "vehicle system") with a primary system and a vehicle safety system (or "safety system"). The safety system can include, but is not limited to, a trajectory management component, a perception component, a filter component, and/or a collision detection component. The trajectory management component can receive status and/or error data from other safety system components and select safe and valid trajectories while the vehicle is navigating the environment. The perception component can utilize sensor data to determine corridors associated with trajectories (e.g., bounded areas corresponding to the trajectories) to improve collision prediction and avoidance by the vehicle. The perception component can validate a trajectory upon which the trajectory management component can wait for selecting a vehicle trajectory, validate trajectories stored in a queue, and/or utilize kinematics data for validation of trajectories. The filter component can perform collision checking to filter out an object with a trajectory that is determined to not be associated with a potential intersection between the vehicle trajectory and the object trajectory. In some examples, the filter component can filter out objects based on trajectories stored in a queue. The collision detection component can determine collision states for the vehicle and utilize the collision states to determine a vehicle safety maneuver to be executed by the vehicle. The collision detection component can determine the collision states based on trajectories stored in a queue or determine a collision state upon which the trajectory management component can wait for selecting a vehicle trajectory.

The trajectory management component can select or otherwise determine a trajectory from among trajectories generated by, and received from, the primary system based on data generated by, and received from, other components of the safety system. The trajectories can include planned trajectories, first safe stop trajectories, second safe stop trajectories, etc. In various examples, such planned trajectories may comprise a plurality of trajectories determined by the primary system, while the first and subsequent safe stop trajectories may be variations of such planned trajectories having differing longitudinal deceleration profiles. Of course, such safe stop trajectories may, in at least some examples, comprise lateral deviations from the planned trajectories as well. Data can be received from the other perception components and utilized by the trajectory management component. The data can include validation results (e.g., validation results for trajectories), status data, or error data. The data can be utilized to select the trajectories to ensure for punctuality, consistency, feasibility, and collision checking. In some examples, the trajectory management component can select a trajectory for the vehicle at any time (e.g., before or after) with respect to some or all of the data generated by the other perception components being received. In other examples, the trajectory management component can wait to receive some or all of the data generated by the other perception components before selecting a trajectory for the vehicle.

The perception component can determine data (or "perception data") associated with corridors representing geometric regions relative to the vehicle (e.g., bounding a region to be immediately traversed by the vehicle), and/or data associated with objects in vicinities of the vehicle. The data associated with the objects can include classifications, instance and/or semantic segmentations, bounding boxes, tracks, route data, global and/or local map data, etc. A corridor can include a part (e.g., a partial part or an entire part) of the environment, such as a part (e.g., a partial part or an entire part) of a roadway and/or a part (e.g., a partial part or an entire part) of an object. The data associated with the objects and/or the corridors can be determined based on one or more of a trajectory received from the primary system, trajectories received from the primary system and stored in a queue of the perception component, and kinematics and/or trajectories utilized for validation (e.g., validation of the trajectory or the trajectories). The trajectories can be analyzed by the perception component based on a corridor or a subset of corridors.

The filter component can receive trajectories and filter out objects in the environment based on the received trajectories. The filter component can be integrated with the trajectory management component, and/or the trajectories can be stored in a queue of the filter component. The filter component can utilize the trajectories to determine objects within vicinities of the vehicle and filter out objects that are determined to not be associated with potential intersections between the vehicle trajectories and the object trajectories. The objects can be filtered out based on a result of an algorithm (or "model") that is executed indicating that a metric (e.g., a number metric and/or probability metric) of driving simulations that result in a collision or near-miss collision (or other potential safety hazard) with the objects is below a threshold metric, and/or can be based on other factors such as the vehicle speeds, driving conditions, risk tolerance configuration of the vehicle safety system, and the like. The algorithm can be utilized to determine possible collision points and/or intersection times between the vehicle and the objects based on vehicle information (e.g., a current trajectory of the vehicle, a current speed of the vehicle, a planned path of the vehicle, etc.) and object information (a current trajectory and/or speed of the object, one or more predicted trajectories and/or speeds of the object). In at least some examples, such filtering may enable the vehicle safety system to devote as much resources as possible to those objects posing the greatest risk of interacting with the vehicle.

The collision detection component can receive trajectories and determine collision states based on received trajectories. The collision states can be determined based on distances predicted to be between objects and the vehicle being less than threshold distances (e.g., predicted distances determined based on trajectories of the objects and trajectories of the vehicle). Velocity vectors and/or potential collision characteristics can be predicted based on determining potential collisions with objects. The predicted velocity vectors and/or potential collision characteristics can be utilized to determine the collision states based on collision probabilities, points of impact, relative collision speeds and/or relative collision angles associated with trajectories of the vehicle. In some examples, a collision state can be determined upon which the trajectory management component can wait for selecting a vehicle trajectory. In other examples, trajectories of the vehicle that are utilized to determine collision states can be stored in a queue. The collision states can be utilized to determine safety maneuvers (e.g., a trajectory) for the vehicle. The collision detection component can operate separately from other vehicle systems and/or components utilized for perception, prediction, trajectory planning, etc., to provide redundancy, error checking, and/or validation of the other vehicle systems and/or components.

The techniques discussed herein can improve a functioning of a computing device in a number of additional ways. The techniques can be utilized to optimize available computational resources by performing operations that limit the impact on the available resources (as compared to not implementing the techniques). Based on one or more outputs from the model of the filter component, available computational resources can be directed to the most relevant objects during vehicle planning thereby improving vehicle safety as the vehicle navigates in the environment. Trajectories can be selected or otherwise determined for the vehicle to more effectively avoid and/or mitigate potential collisions with other moving objects in the environment. The vehicle system can determine the trajectories and accurately switch to the selected trajectories after detecting potential collisions, executing new perception models, and/or generating or validating new trajectories on the fly after potential collisions have been detected.

Moreover, by operating the trajectory management component to wait for results from less than all of one or more other safety system components (e.g., the perception component, the filter component, and/or the collision detection component), computing resources can be conserved by not performing operations based on data that is later determined to be outdated or inaccurate. To avoid operational delays and/or lags in the trajectory management component, the trajectory management component can wait for some, but possibly not all, of the other safety system components. Additionally or alternatively, the trajectory management component can operate without waiting for any of the other safety system components. By the trajectory management component waiting for less than all of the other safety system components to perform operations utilized to control the vehicle, latency of the trajectory management component can be reduced.

By storing trajectories in queues of the perception component utilized to determine data associated with corridors and/or objects, computing resources that might otherwise be exhausted due to an emergency can be utilized more resourcefully with a lower level of urgency. One or more safety system components (e.g., the filter component) being integrated with the trajectory management component and/or being utilized to store the trajectories in a queue can eliminate unnecessary processing of data, reduce redundant data processing, and/or reduce any urgency of processing of the data. By storing trajectory(ies) in the queue(s) of the corresponding safety system component(s), the trajectory management component can switch back and forth between trajectory(ies) (or fallback to a previously validated trajectory) based on information associated with the respective trajectory(ies) being determined by, and received from, the corresponding safety system component(s) utilizing the corresponding queue(s). Computing resources that might otherwise be exhausted due to an emergency can be utilized more resourcefully with a lower level of urgency, also based on the collision states being determined for trajectories stored in queues of the collision detection component. Processing data at lower levels of urgency can allow better time allocation and/or prioritization of different types of data processing.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configure to input data to determine movement associated with objects in an environment. Additionally, the techniques described herein can be used with real data (e.g., captured using sensor(s)), simulated data (e.g., generated by a simulator), or any third of the two.

FIG. 1 is a block diagram of an example vehicle system 100 of a vehicle travelling through an environment, the vehicle system 100 including safety system components, in accordance with examples of the disclosure.

The vehicle system 100 can include a vehicle safety system 102 for ensuring safe operation of the vehicle. The vehicle safety system 102 can receive data (or "primary system data") from a primary system of the vehicle system 100. The data received from the primary system can include sensor data 104 and trajectory data 106. The sensor data 104 can include data received from one or more sensors of any of one or more systems (e.g., the sensor system(s) 606, as discussed below with reference to FIG. 6) in the vehicle system 100. The trajectory data 106 can include any data associated with one or more trajectories determined by one or more systems (e.g., the primary system, which can be implemented as one or more of the first computing device(s) 604, as discussed below with reference to FIG. 6) of the vehicle system 100. In various examples, such trajectory data 106 may comprise one or more desired vehicle states (e.g., headings, positions, steering angles, rotation rates, etc.) and/or an associated set of commands (e.g., acceleration, torque, voltage, steering angle, etc.).

The trajectory data 106 can include one or more trajectories (e.g., trajectory(ies) of different types) for the vehicle. The trajectory(ies) (or "received trajectory(ies)") (or "candidate trajectory(ies)") can include a planned trajectory, and/or one or more other trajectories (or "alternative trajectory(ies)") (e.g., a first safe stop trajectory (or "error trajectory"), a second safe stop trajectory (or "high-priority error trajectory"), a third safe stop trajectory (or "immediate stop trajectory"), etc.). The planned trajectory that is received can be generated based on the sensor data 104, which can include data (or "object data") associated with one or more objects in the environment. Such a planned trajectory may comprise a nominal trajectory for traversing an environment as determined in accordance with various systems such as, for example, as described in U.S. Pat. No. 11,048,260 entitled "Adaptive Scaling in Trajectory Generation", the entire contents of which are hereby incorporated by reference. The alternative trajectory(ies) can include various types of error trajectories, which can include critical error trajectories, etc.

The primary system data can include one or more other data (e.g., vehicle status data), some of all of which can be included in, and/or be separate from, one or more of the trajectory data 106 and the sensor data 104. The vehicle status data can include various types of data including performance metrics, component errors, alerts, system faults, malfunctions, and/or manual or automated requests to change to or from an alternative trajectory. In some examples, the vehicle status data can include data identifying system faults, errors, alerts, etc., which are associated with any of the different types of received trajectories. The vehicle status data can also include requests for the autonomous vehicle to follow a trajectory (or "requested trajectory"), which can include any of the received trajectory(ies). The vehicle status data can be received via internal signals from the primary system, in accordance with internal timing and processing cycles of components of the primary system.

The vehicle safety system 102 can include a trajectory management component 108 (e.g., a first component), a perception component 110 (e.g., a second component), a filter component 112 (e.g., a third component), and a collision detection (or "machine learned (ML)") or ("neural network") component 114 (e.g., a fourth component). In some examples, a portion (e.g., a partial portion or an entire portion) of the vehicle system data (e.g., the sensor data 104 and/or the trajectory data 106) can be received from the primary system and by the trajectory management component 108. In those examples in which a partial portion of the vehicle system data (e.g., the trajectory data 106) is received by the trajectory management component 108, a remaining portion of the vehicle system data (e.g., the sensor data 104) can be received by the trajectory management component 108 and/or one or more of the remaining components (e.g., one or more of the perception component 110, the filter component 112, and the collision detection component 114) of the vehicle safety system 102. In some examples, the same vehicle system data can be received by one or more of the trajectory management component 108, the perception component 110, the filter component 112, and the collision detection component 114. The trajectory management component 108 can transmit (e.g., route), in some examples in which the trajectory management component 108 receives a portion the trajectory data 106 and/or the sensor data 104, some or all of the received portion of trajectory data 106 and/or the sensor data 104 to one or more of any of the remaining components of the vehicle safety system 102 (e.g., some or all of the portion of the trajectory data 106 and/or the sensor data 104 can be received from the primary system and by one or more of any of the remaining components of the vehicle safety system 102, via the trajectory management component 108).

Although any of the components (the trajectory management component 108, the perception component 110, the filter component 112, and the collision detection component 114) of the vehicle safety system 102 can receive a different portion of the vehicle system data than any other components of the vehicle safety system 102, as discussed above in the current disclosure, it is not limited as such. Any portion (e.g., a partial portion or an entire portion) of the vehicle system data can be received from the primary system and by one or more of any of the components of the vehicle safety system 102 (e.g., the trajectory data 106 and/or the sensor data 104 received from the primary system and by one or more of any of the remaining components of the vehicle safety system 102 does not need to pass through the trajectory management component 108).

The trajectory management component 108 can process the received portion of the vehicle system data (e.g., the sensor data 104 and/or the trajectory data 106). In some examples, the trajectory management component 108 can determine a selected (or "output") trajectory for the vehicle to follow. The trajectory management component 108 can determine the selected trajectory based on trajectory validation results (e.g., results associated with one or more stored possible trajectories), vehicle status data (e.g., status data from one or more vehicle components, including vehicle sensors, a vehicle platform, a pose system, vehicle monitor systems, and/or any other system of the autonomous vehicle), and/or manual or automated requests to change to or from alternative trajectories. The vehicle status data can include performance metrics, component errors, alerts, system faults, and system malfunctions.

In some examples, for instance with the planned trajectory and the alternative trajectory(ies) being included in the trajectory data 106, the trajectory management component 108 can determine any of the received trajectories (or "current trajectories") (e.g., the planned trajectory and the alternative trajectory(ies)) as the selected trajectory. In alternative or additional examples in which the trajectory data 106 includes the planned trajectory, but not the alternative trajectory(ies), the trajectory management component 108 can determine the planned trajectory as the selected trajectory. In those or other examples, the trajectory management component 108 can generate the alternative trajectory(ies) based on the planned trajectory, determine any of the received trajectories (e.g., the planned trajectory and the alternative trajectory(ies)) as the selected trajectory. Additional examples of generating, evaluating, and determining trajectories can be found, for example, in U.S. patent application Ser. No. 17/514,610 titled "Autonomous Vehicle Trajectory Determination Based on State Transition Model" and filed Oct. 29, 2021, the entirety of which is herein incorporated by reference and for all purposes.

The trajectory management component 108 can manage and store various trajectories. In some cases, the trajectories can be managed and stored via a state transition model of the trajectory management component 108. The trajectory management component 108 can store the current trajectory(ies), including the selected trajectory. In some examples, the trajectory management component 108 can also retain one or more previous trajectories (e.g., any of the previous trajectory(ies) received and/or determined by the trajectory management component 108). Such stored trajectories may provide a failsafe in the event that the vehicle safety system does not receive an updated trajectory from the primary system.

Operation of the trajectory management component 108 can be asynchronous or synchronous with respect to any of the remaining components (e.g., any of the perception component 110, the filter component 112, and the collision detection component 114) of the vehicle safety system 102. Operation of any of the components (e.g., any of the perception component 110, the filter component 112, and the collision detection component 114) of the vehicle safety system 102 can be asynchronous or synchronous with respect to any other component (e.g., any of the perception component 110, the filter component 112, and the collision detection component 114). In some examples, the trajectory management component 108 can select a trajectory for the vehicle at any time (e.g., before or after) with respect to a portion (e.g., a partial portion or an entire portion) of the data generated by any of one or more of the other perception components being received. By not waiting, the trajectory management component 108 may ensure a minimum amount of latency for responding to a potential collision. In other examples, the trajectory management component 108 can wait to receive a portion (e.g., a partial portion or an entire portion) of the data generated by any of one or more the other perception components before selecting a trajectory for the vehicle. In such examples, false positives may be avoided by ensuring there is no inconsistency of the data. The data upon which the trajectory management component 108 can wait can include the data received in the signals (e.g., the signals 116-120) from the components of the vehicle safety system, based on the corresponding hashing functions of the components, as discussed below.

The perception component 110 can determine data (or "perception component data") (or "perception data") associated with one or more corridors representing geometric regions relative to the vehicle, and/or data associated with objects in vicinities of the vehicle. In some examples, the perception component 110 determine the perception data by evaluating one or more trajectories from among the trajectory(ies) received from the primary system. The trajectory(ies) can be evaluated by the perception component 110 with respect to one or more corridors associated with the vehicle.

The perception component 110 can determine the perception data in various ways based on various types of data. In some examples, the perception component 110 can determine the perception data by evaluating corridor(s), without any trajectories being received. In some examples, the perception component 110 can determine one or more trajectories associated with a corridor, based on the corridor being received by the perception component 110. In other examples, the perception component 110 can determine one or more trajectories associated with a subset of corridors, based on the subset of corridors being received by the perception component 110.

In some examples, the perception component 110 can evaluate a trajectory (e.g., a single trajectory received from the primary system) with respect to one or more corridors associated with the vehicle. By way of example, a corridor can be region of the environment determined based at least in part on a candidate trajectory, vehicle extents (e.g., width, length, height), current velocity of the vehicle, a velocity specified by the trajectory, and/or an offset based on steering rack actuator gains, vehicle kinematics, etc. The kinematics associated with the vehicle can include a minimum turning radius, a maximum turning rate, tire slippage, body roll, etc., of the vehicle. In those examples in which kinematics are used, the corridor may be limited to the region of the environment in which the vehicle is capable of operating over a period of time and may include a buffer. In at least some such examples, the period of time may correspond to the amount of time to fully stop the vehicle according to any one or more deceleration profiles.

The trajectory that is evaluated can be stored in the perception component 110 and/or transmitted as the perception component data to the trajectory management component 108. In some examples, the trajectory (e.g., the single trajectory) can be evaluated and utilized to determine an intersection probability (e.g., a single intersection probability associated with one or more objects). The trajectory can be evaluated based on a corridor (e.g., a single corridor) associated with the trajectory or a subset of corridors associated with the trajectory. In some examples, results of evaluation of the trajectory by the perception component 110 can be transmitted to, and received by, the trajectory management component 108, which can wait upon the results prior to performing trajectory selection.

The intersection probability determined by the perception component 110 can be utilized by the trajectory management component 108 to analyze and/or determine information (or "object information") about one or more objects in the corridor (e.g., the trajectory management component 108 can utilize the intersection probability to determine the corresponding likelihood of collision). By waiting to receive object(s) identified by the perception component 110 based on the evaluated trajectory, the trajectory management component 108 is guaranteed, prior to advance to a next frame (e.g., a next step) for trajectory selection, to have any relevant information from the perception component 110 about the identified object(s).

In some examples, perception component information (e.g., information including one or more intersection probability(ies), which can incorporate, and/or be utilized to determine, various characteristics associated with corresponding object(s)) can be identified and/or determined by the perception component 110. The perception component information can include information associated with object(s) proximate the vehicle, a value indicating how close an object is to the vehicle and/or one or more predicted future locations of the vehicle, a value indicating how rapidly the object is approaching the vehicle or respective direction(s) of the predicted future vehicle location(s) of the vehicle, a value indicating how closely aligned a direction of travel of the object is with a current location or the predicted future vehicle location(s), etc.) in the corridor. The perception component information can be determined and/or utilized in a similar way as discussed above for the intersection probability (e.g., the perception component information can be transmitted by the perception component 110 and to the trajectory management component 108).

Additional examples of determining corridors and validating trajectories can be found, for example, in U.S. patent application Ser. No. 16/588,529 titled "Collision Avoidance Perception System" and filed Sep. 30, 2019, the entirety of which is herein incorporated by reference and for all purposes. Additional examples of determining perception information utilized for trajectory selection can be found, for example, in U.S. patent application Ser. No. 17/514,542 titled "Collision Avoidance and Mitigation in Autonomous Vehicles" and filed Oct. 29, 2021, the entirety of which is herein incorporated by reference and for all purposes.

In some examples, the perception component 110 can evaluate more than one trajectory (e.g., trajectories received from the primary system) (e.g., a first trajectory and a second trajectory) and utilized the more than one trajectory to determine more than one intersection probability. In some examples, the first trajectory can be a previous trajectory (e.g., a trajectory generated by the primary system in a previous frame (e.g., a previous step)), and the second trajectory can be a current trajectory (e.g., a trajectory generated by the primary system in a current frame (e.g., a current step)). The more than one trajectory can be stored in a queue (or "buffer of trajectory(ies)," e.g., a buffer of recent trajectory(ies)) of the perception component 110. In some examples, individual ones of the more than one trajectory (and/or one or more safe stop trajectories) can be evaluated based on a corridor (e.g., a single corridor) associated with a corresponding trajectory or a subset of corridors associated with the corresponding trajectory. In other examples, the more than one trajectory can be evaluated as a group of the more than one trajectory based on a corridor (e.g., a single corridor) associated with the group or a subset of corridors associated with the group.

In some examples, for instance with a number of the more than one trajectory for which the perception component 110 evaluates intersection probabilities being two, the perception component information (e.g., object(s) associated with corresponding collision probability(ies) above a collision probability threshold) for the two trajectories can be stored utilizing a two-deep queue. In those examples, the trajectory management component 108 does not have to wait for the perception component information before proceeding to a next frame. In those examples, in general, sufficient information (e.g., perception component information) associated with various trajectories (e.g., the planned trajectory and one or more of a first safe stop trajectory, the second safe stop trajectory, the n-th safe stop trajectory, etc.) for various frames (e.g., a current frame and a previous frame (e.g., stored frame)) can be identified by the perception component 110 and provided to the trajectory management component 108.

In some examples, determining the intersection probability(ies) can include an ongoing determination (e.g., continuously (or "always") publishing) of object information for object(s) that are relevant to any of the trajectory(ies). This can enable the trajectory management component 108 to switch back and forth between the trajectory(ies), based on any detection of object(s) for any of the trajectory(ies). As such, operational safety and reliability of the vehicle can be increased.

In some examples, the trajectory(ies) can be evaluated by the perception component 110 based on kinematics and/or the trajectory(ies) associated with the vehicle. With examples in which the trajectory(ies) are evaluated with respect to the subset of corridors, the subset of corridors can be determined based on the kinematics and/or the trajectory(ies).

The perception component information can include the kinematics and/or the trajectory(ies). The kinematics and/or the trajectory(ies) can be analyzed to determine intersection probabilities associated with objects. In some examples, the perception component 110 can determine a physics based collision state (e.g., a state utilizing, and/or incorporating, the kinematics). The physics based collision state can include, based on the kinematics, information (e.g., a value) indicating a predicted collision of the vehicle with another object (e.g., another vehicle, object in the environment, etc.). The kinematics can include any characteristics related to motion of the vehicle, such as vehicle motion data (e.g., a speed, a velocity, a turn rate, etc.), and/or any determinations associated with motion (e.g., a feasibility of a current velocity, a rate at which the vehicle is able (e.g., safely able, or allowed), to turn, etc.). A combination of the kinematics and the trajectory(ies), which can be included in the perception component information, can be analyzed along with object characteristics (e.g., characteristics of an object) and utilized to determine the intersection probability(ies) associated with corresponding object(s) and the vehicle.

By determining the kinematics and/or the trajectory(ies), the perception component 110 can determine the physics based collision state(s) (e.g., state(s) indicating corresponding intersection probability(ies)). In some examples, the physics based collision state(s) can be determined by evaluating the kinematics and the trajectory(ies) (e.g., an envelope of possible trajectory(ies)). The kinematics, the trajectory(ies), and/or the physics based collision state(s) can be determined based on any possible trajectory of the vehicle.

The perception component 110 can operate according to one or more modes (or "configuration(s)" or "operation state(s)") to evaluate the trajectory(ies). The perception component 110 can operate in a first mode to evaluate the trajectory (e.g., a single trajectory) with respect to the corridor or the subset of corridors. The perception component 110 can operate in a second mode to evaluate the more than one trajectory with respect to the corridor or the subset of corridors. The perception component 110 can operate in a third mode to evaluate the trajectory(ies) based on kinematics and/or the trajectory(ies) associated with the vehicle. The third mode can be utilized to determine physics based collision state(s) based on the kinematics and/or the trajectory(ies).

Operation by the perception component 110 in any of the mode(s) can occur in any order and at any time. The mode(s) can be determined, set, and/or modified by the perception component 110, one or more other components of the vehicle, and/or an operator. The mode(s) can be utilized based on various factors (e.g., compute resources, network resources, storage resources, etc.), preferences, etc. associated with the perception component 110 and/or one or more other components. To reduce demands placed on storage resources, the first mode can be used, since an amount of storage resources for management of information associated with the single trajectory may be less than an amount of storage resources for the second mode which is utilized to manage the more than one trajectory and/or the subset of corridors. In some examples, different modes can refer to dynamically switched modes (e.g., based on vehicle state or context) or statically-implemented modes.

In order to provide relatively greater operational safety for the vehicle, the second mode can be used, since the second mode which manages the more than one trajectory and/or the subset of corridors can provide a previous (or "older") trajectory in the event that there is a need to switch back to the previous trajectory (e.g., the second mode stores information to make sure that any object information associated with the previous trajectory is available for collision checking). In other words, the second mode provides the option for support by the perception component 110 to fall back to the previous trajectory. The perception component 110 that stores information for more than one trajectory can provide the information to the trajectory management component 108, should the trajectory management component 108 determine the current trajectory is invalid or no longer usable (e.g., invalid due to an occurrence of an obstruction).

In order to detect object(s) that may or may not be otherwise detected by the perception component 110 in the first mode and/or the second mode, the third mode can be utilized. In some examples, the perception component 110 operating in the third mode can validate a broader corridor than in the first and/or second mode, the broader corridor including any possible location of the trajectory of the vehicle. As an example, by determining dynamic limits of vehicle, a cone in front of the vehicle can be determined and utilized to show any possible area that a trajectory can be located. Then, any portion of that cone can be validated. The cone characteristics (e.g., size, location, etc.) of the cone can be determined (e.g., scoped down by a desired percentage) based on information from the primary system that indicates possible locations of a corridor of the environment through which the vehicle may safely travel and that can be used to validate everything within that cone. In some examples, any features (e.g., the cone) determined in the third mode can be based on the kinematics. In some examples, any features (e.g., the cone, the kinematics, etc.) determined in the third mode can be utilized to determine the physics based collision state(s).

Although the term "mode" is utilized with respect to operation of the perception component 110, as discussed above in the current disclosure, it is not limited as such. In some examples, the perception component 110 can utilize some or all of the modes, as well as one or more features/ functions of corresponding modes with or without active mode selection. In those or other examples, the perception component 110 can be configured to operate utilizing, at any time, one or more of i) a single trajectory, ii) more than one trajectory, and/or iii) kinematic(s) and/or trajectory(ies), by default (e.g., a predetermined configuration), by automatic and/or dynamic (e.g., real-time or near real-time) determination and/or selection, by active selection by the perception component 110 and/or other vehicle components (e.g., other safety components), etc.

The perception component 110 can evaluate one or more objects. The evaluated trajectory(ies) can be utilized to determine the object(s) to be evaluated. In some examples, the object(s) can include individual ones of the object(s) being determined based on the corresponding trajectory(ies) (e.g., object(s) (e.g., a first object) can be determined based on the first trajectory and object(s) (e.g., a second object) can be determined based on the second trajectory). The individual ones of the object(s) can be evaluated based on the corresponding trajectory(ies) (e.g., object(s) (e.g., a first object) can be evaluated based on the first trajectory and object(s) (e.g., a second object) can be evaluated based on the second trajectory). The object(s) can be evaluated to determine data (or "object state data") (e.g., a heading, a speed, a velocity, a trajectory, a turn rate for a given speed, etc.) associated with the object(s). Alternatively or additionally, the object(s) can be evaluated to determine one or more intersection probabilities indicating one or more likelihoods that the vehicle and the object(s) intersect along the trajectory at one or more intersection points. Additional examples of determining intersection probability(ies) can be found, for example, in U.S. patent application Ser. No. 17/133,306 titled "Procedurally Generated Safety System Determination" and filed Dec. 23, 2020, the entirety of which is herein incorporated by reference and for all purposes.

In some examples, the perception component 110 can transmit a signal (e.g., a first signal) 116 based on results of operating the perception component 110. The signal 116 can be transmitted to the trajectory management component 108 based on the evaluating of the trajectory(ies). The evaluating of the trajectory(ies) can include validating the trajectory(ies) and determining, based on the validating of the trajectory(ies), individual ones of the intersection probability(ies) are less than a threshold intersection probability. The signal 116 can include data (e.g., perception component information) indicating results of the validating of the individual ones of the trajectory(ies) (e.g., data indicative of the individual ones of the trajectory(ies) evaluated with respect to the corridor or the subset of corridors) and/or data including the individual ones of the intersection probability (ies).

The filter component 112 can receive the trajectory(ies) and utilize the trajectory(ies) to filter out one or more objects in the environment. The filter component can utilize the trajectory(ies) to determine one or more objects within a vicinity of the vehicle and filter out individual ones of one or more of the determined object(s) that are determined to not be associated with a potential intersection between the corresponding vehicle trajectory and the corresponding object trajectory. By way of example, an object can be filtered out based on determining a trajectory of the object is not associated with a potential intersection with any of the received vehicle trajectory(ies). The filter component 112 can be integrated with the trajectory management component 108, and/or the trajectory(ies) (e.g., a third trajectory and a fourth trajectory) can be stored in a queue of the filter component 112. In some examples, the third and fourth trajectories stored in the queue of the filter component 112 can be the same as the first and second trajectories, respectively, stored in the perception component 110. In other examples, one or more of the third and fourth trajectories can be different from one or more of the first and second trajectories.

In some examples, the filter component 112 can transmit a signal (e.g., a second signal) 118 based on results of operating the filter component 112. The signal 118 can be based transmitted to the trajectory management component 108 on the filtering out of the object(s). The signal 118 can include data indicating results (e.g., the filtered object(s) and/or resulting object(s) based on the filtered object(s) being excluded) of the filtering out of the object(s). In some examples, any of the objects (e.g., unfiltered objects) utilized by the filter component 112 to determine physics based collision states (as discussed below) and/or to generate the signal 118, can be the same as, or different from, any of the object(s) utilized by the perception component 110 to determine the intersection probability(ies) and/or utilized to generate the signal 116. In some examples, any of the objects (e.g., unfiltered objects) utilized by the filter component 112 to determine physics based collision states (as discussed below) and/or to generate the signal 118, can be the same as, or different from, any of the object(s) utilized by the collision detection component 114 and/or utilized to generate the signal 120.

In some examples, the filter component 112 can perform one or more collision checks associated with the object(s) that are excluded (e.g., filtered out) or the object(s) that are not excluded (e.g., not filtered out). The collision check(s) can be utilized to determine corresponding collision state(s) (e.g., physics-based collision state(s)).

The collision detection component 114 can receive trajectory(ies) (e.g., the planned trajectory and/or one or more of a first safe stop trajectory, the second safe stop trajectory, the n-th safe stop trajectory, etc.) and determine one or more collision states (e.g., likelihood(s) of collision) based on received trajectory(ies). The collision state(s) can be determined based on distances predicted to be between one or more objects and the vehicle being less than threshold distances (e.g., predicted distances determined based on the received trajectory(ies) of the corresponding object(s) and trajectory(ies) of the vehicle). By way of example, a collision state can be determined to be meet or exceed a threshold collision state based on a distance predicted to be between an object and the vehicle being less than a threshold distance. Additional examples of collision states can be found, for example, in U.S. patent application Ser. No. 17/514,542 titled "Collision Avoidance and Mitigation in Autonomous Vehicles" and filed Oct. 29, 2021, the entirety of which is herein incorporated by reference and for all purposes.

The collision detection component 114 can receive trajectory(ies) generated by the primary system, the received trajectory(ies) including the planned trajectory, or a group of trajectories (e.g., the planned trajectory and one or more of a first safe stop trajectory, the second safe stop trajectory, the n-th safe stop trajectory, etc.). In some examples with the collision detection component 114 receiving the planned trajectory, and possibly no other trajectories), the collision detection component 114 can determine one or more alternative trajectories (e.g., a first safe stop trajectory, the second safe stop trajectory, the n-th safe stop trajectory, etc.). The alternative trajectory(ies) can be determined by the collision detection component 114 based on the received planned trajectory.

The collision detection component 114 can store the planned trajectory (e.g., a fifth trajectory) and another planned trajectory (e.g., a previous planned trajectory) (e.g., a sixth trajectory) and/or any number of previously determined safe stop trajectories in a queue of the collision detection component 114. In some examples, the fifth and sixth trajectories stored in the queue of the collision detection component 114 can be the same as the first and second trajectories, respectively, and/or the third and fourth trajectories, respectively. In other examples, one or more of the fifth and sixth trajectories can be different from one or more of the first-fourth trajectories, based on the corresponding frame with which any of the trajectories is associated.

In some examples, the collision detection component 114 can determine machine learned (ML) based one or more collision states based on the stored trajectory(ies), and/or based on one or more object trajectories determined for corresponding object(s) in the environment. The collision detection component 114 can transmit a signal (e.g., a third signal) 120 based on results of operating the collision detection component 114. The signal 120 can include the ML based on collision state(s). The signal 120 can be transmitted to the trajectory management component 108 based on the determining the collision state(s). The signal 120 can include data indicating results of the determining the collision state(s).

In some examples, any of the objects (e.g., unfiltered objects) utilized by the collision detection component 114 to determine ML based collision states and/or to generate the signal 120, can be the same as, or different from, any of the object(s) utilized by the perception component 110 to determine the intersection probability(ies) and/or utilized to generate the signal 116. In some examples, any of the objects (e.g., unfiltered objects) utilized by the collision detection component 114 to determine ML based collision states and/or to generate the signal 120, can be the same as, or different from, any of the objects (e.g., unfiltered objects) utilized by the filter component 112 to determine physics based collision states (as discussed below) and/or utilized to generate the signal 118.

The trajectory management component 108 can output data based on results from components of the vehicle safety system 102. The data output from the trajectory management component 108 can include control data 122. The control data 122 can be utilized to control the vehicle. The control data 122 can be determined based on one or more of the results (e.g., the validated trajectory(ies) and/or the collision probability(ies)) received from the perception component 110, the results (e.g., the filtered object(s) and/or resulting object(s) based on the filtered object(s) being excluded) received from the filter component 112, and the results (e.g., the collision state(s)) received from the collision detection component 114. The control data 122 can include one or more of validation information (e.g., any results from any of the perception component 110, the filter component 112, and/or the collision detection component 114), the planned trajectory, the first safe stop trajectory, the second safe stop trajectory, the n-th safe stop trajectory, etc. The control data 122 can include as a selected trajectory, any of the planned trajectory, the first safe stop trajectory, the second safe stop trajectory, the n-th safe stop trajectory, etc., based on a selection of one of the trajectory(ies) be the trajectory management component 108. The selected trajectory can be based on results received from the perception component 110, the filter component 112, and/or the collision detection component 114.

In some examples, the trajectory management component 108 can utilize any results from some or all of the perception component 110, the filter component 112, and/or the collision detection component 114 to avoid collisions. In other words, if any results from one or more of the perception component 110, the filter component 112, and/or the collision detection component 114 indicate a potential collision, the trajectory management component 108 can modify the trajectory for the vehicle (e.g., change to a safer trajectory, such as from the planned trajectory to a safe-stop trajectory).

The trajectory management component 108 can utilize results (e.g., results from the perception component 110, the filter component 112, and/or the collision detection component 114) associated with higher likelihoods of collision than other results (e.g., one or more other results from the perception component 110, the filter component 112, and/or the collision detection component 114) associated with relatively lower likelihoods of collision. The results with the relatively higher likelihoods of collision can be utilized by the trajectory management component 108 to select a different trajectory (e.g., one of the safe stop trajectories). In some examples, the trajectory management component 108 can determine to operate according to higher likelihood(s) of collision from corresponding component(s) by changing to another trajectory (e.g., safer trajectory), regardless of remaining component(s) indicating borderline, or lower likelihood(s) of collision (e.g., the trajectory management component 108 can ignore results associated with borderline, or lower likelihood(s) of collision, and instead perform trajectory selection based on the results associated with the higher likelihood(s) of collision). Although the trajectory management component 108 performs collision checking, results from any additional collision checking performed by other components (e.g., specific collision checking performed by the collision detection component 114 to output results, such as a "thumbs up" or "thumbs down" for corresponding trajectory(ies)) can be utilized by the trajectory management component 108 as well.

The trajectory management component 108 can utilize results (e.g., tracks) received from one or more of the perception component 110 and the filter component 112 to perform, based on the respective results, collision checking at a respectively finer (or "refined" or "more detailed") level (e.g., a higher level of detail, precision, granularity, etc.) (e.g., collision checking and/or predictions performed utilizing a prediction server, which can include kinematic-based predictions based on one or more of the signals 116, 118, and 120). The operations of the prediction server (e.g., results used for collision checking performed by the trajectory management component 108) can be utilized to predict a future outcome (e.g., behavior, location, position, etc.) of a corresponding object.

By way of example, the prediction server can determine prediction server information (e.g., information indicating how an object might proceed (e.g., whether an object is capable of turning, accelerating, decelerating, or some combination of turning, accelerating, or decelerating, etc.), how, at one or more points in time, the object might proceed, etc.). Intersection probability(ies) associated with the object(s) can be determined by the prediction server and/or the trajectory management component 108 based on the prediction server information and/or the trajectory(ies) stored in the trajectory management component 108 (e.g., the results of the prediction server can be checked against the corresponding stored trajectory(ies)). Results of the prediction server can be checked against the corresponding stored trajectory(ies) by utilizing polygon checks, which include comparing trajectory(ies) of the object(s) (e.g., by propagating (or "perturbing") the object(s) along the object trajectory(ies)) with the trajectory of the vehicle (e.g., by propagating the vehicle along the vehicle trajectory), to determine corresponding time(s) to possible collisions. In some examples, perturbing the object(s) and/or the vehicle can include perturbing the object(s) and/or the vehicle along movement (e.g., predicted movement) of any form (e.g., a steering angle, velocity, acceleration, etc.) associated with the object(s) and/or the vehicle. The intersection probability(ies). In some examples, results of perturbing the object(s) and/or the vehicle can be included in the prediction server information, which can be generated by, transmitted to, and/or utilized by, the trajectory management component 108. Additional examples of collision prediction and avoidance can be found, for example, in U.S. patent application Ser. No. 16/884,975 titled "Vehicle Collision Avoidance Based on Perturbed Object Trajectories" and filed May 27, 2020, the entirety of which is herein incorporated by reference and for all purposes.

Although the prediction server is discussed as being separate from other safety components, as discussed in the current disclosure, it is not limited as such. In some examples, the prediction server can be integrated with, and/or implemented to interoperate with, one or more other components (e.g., trajectory management component 108, the perception component 110, the filter component 112, and/or the collision detection component 114).

By utilizing the trajectory management component 108 to analyze results (e.g., information received via the signals 116, 118, and 120) determined by the perception component 110, the filter component 112, and/or the collision detection component 114, the vehicle can be controlled more accurately and safely. For example, physical based collision states received from the perception component 110, objects received based on filtering performed by the filter component 112, and machine learned (ML) collision states received from the collision detection component 114, can be utilized by the trajectory management component 108 to more accurately select vehicle trajectory(ies). Robustness of vehicle operation is also improved due to redundancy of operations. By way of example, although the collision detection component 114 determines ML based collision states, different corresponding types of analyses performed by the collision detection component 114 and the trajectory management component 108 can ensure likelihoods of collision determined by the trajectory management component 108 are correct. However, because there is a potentially long latency of operation of the trajectory management component 108 due to respectively longer operation times required by the collision detection component 114, the trajectory management component 108 can perform, in certain circumstances, collision checking operations prior to receiving results from the collision detection component 114 to reduce latency (e.g., the trajectory management component 108 can select a different, possibly less direct but safer alternate trajectory, if results from the collision detection component 114 related to the current selected trajectory are delayed).

Although the trajectory management component 108, the perception component 110, the filter component 112, and the collision detection component 114 can be separate components, as discussed above in the current disclosure, it is not limited as such. In some examples, one or more of any of components (e.g., the trajectory management component 108, the perception component 110, the filter component 112, and the collision detection component 114) of the vehicle safety system 102 can be integrated with one or more of any of the remaining components (e.g., the trajectory management component 108, the perception component 110, the filter component 112, and the collision detection component 114) of the vehicle safety system 102.

Although the signals 116, 118, and 120 are received by the trajectory management component 108, as discussed above in the current disclosure, it is not limited as such. In some examples, any component (e.g., the primary system) can perform analysis, and then generate and/or transmit the signals 116, 118, and 120 to the trajectory management component 108 in a similar way as the perception component 110, the filter component 112, and the collision detection component 114, respectively. In some examples, a first primary system, a second primary system, and a third primary system, and/or any combination thereof, can perform analysis, and then generate and/or transmit any of the signals 116, 118, and 120, respectively.

In some examples, the trajectory management component 108, the perception component 110, the filter component 112, and the collision detection component 114, whether being implemented as one or more integrated components, one or more individual/separate components, or any combination thereof, can exchange any information between one another (e.g., any information determined by any of the trajectory management component 108, the perception component 110, the filter component 112, and the collision detection component 114 can be exchanged with any other of the trajectory management component 108, the perception component 110, the filter component 112, and the collision detection component 114). In those or other examples, any analysis and/or determinations made by any of the trajectory management component 108, the perception component 110, the filter component 112, and the collision detection component 114 can be made by information received from one or more of any other of the trajectory management component 108, the perception component 110, the filter component 112, and the collision detection component 114. By independently and/or redundantly operating any of the trajectory management component 108, the perception component 110, the filter component 112, and the collision detection component 114, robustness of operation of any of the components, and/or the overall vehicle system, can be increased.

Although various components of the vehicle safety system 102 can utilize the subset of corridors, as discussed above in the current disclosure, it is not limited as such. In some examples, any of the techniques discussed herein can be performed utilizing a modified corridor, based on the subset of corridors being combined together and determined as the modified corridor.

Although trajectories (e.g., the first trajectory and the second trajectory) can be stored in the queue of individual ones of the perception component 110, the filter component 112, and the collision detection component 114, as discussed above in the current disclosure, it is not limited as such. Any number of trajectories can be stored in the queue of individual ones of the perception component 110, the filter component 112, and the collision detection component 114. Any of the trajectories stored in any the queues of the perception component 110, the filter component 112, and the collision detection component 114 can the same or different from those stored in any of the other queues.

Figure 2:
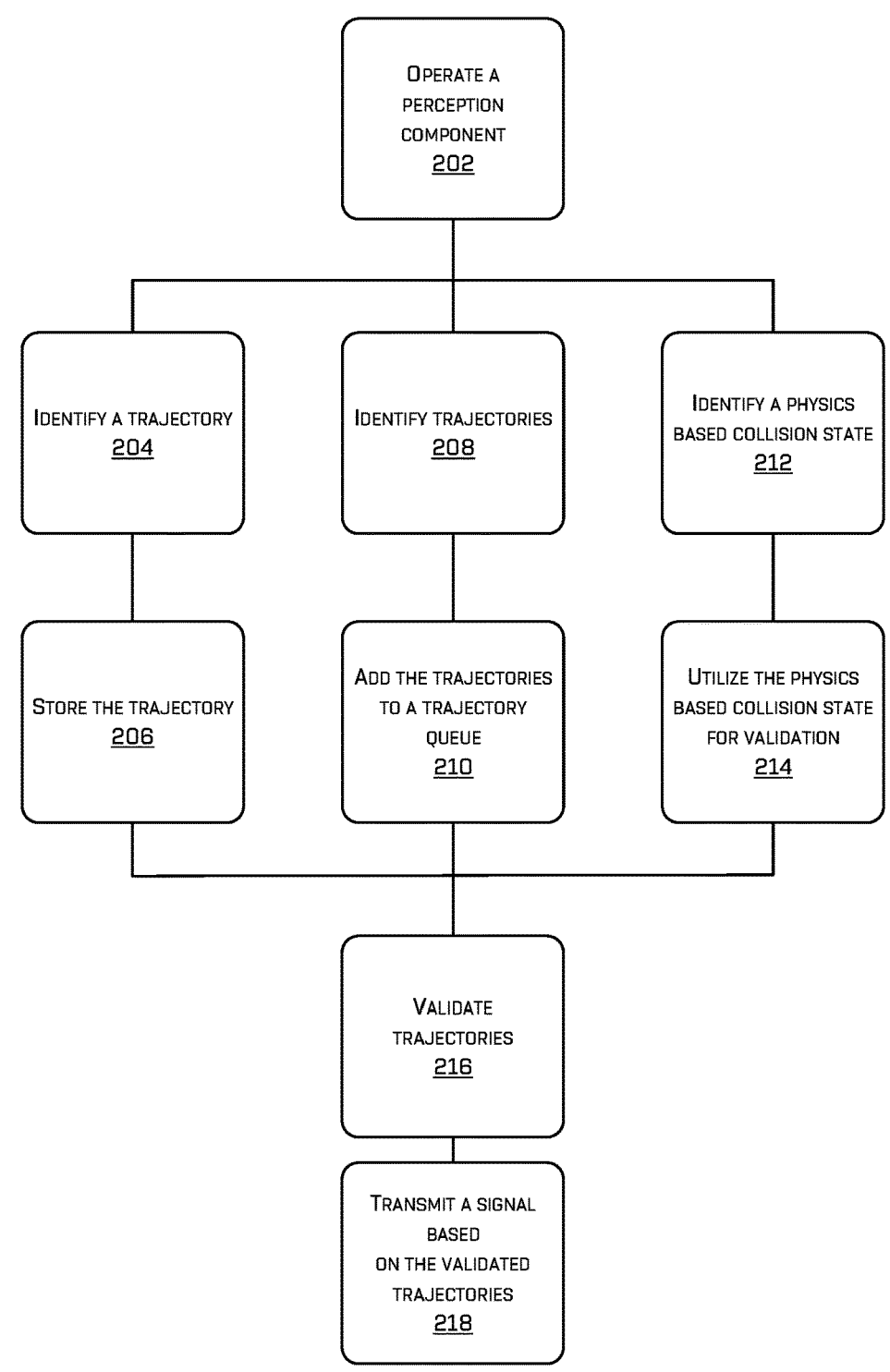
FIG. 2 is a flow diagram of an example process for operation of a perception component, in accordance with examples of the disclosure.

FIG. 2 is a flow diagram of an example process for operation of a perception component, in accordance with examples of the disclosure. In some examples, example process 200 can be executed by at least a perception component (e.g., the perception component 110, as discussed above with reference to FIG. 1).

At operation 202, example process 200 can include operating the perception component 110 to determine a mode (or "selected mode") based on a selection from among one or more modes utilized for operation of the perception component 110. The mode(s) can include a first mode for validating a trajectory, a second mode for validating more than one trajectory, and a third mode for utilizing kinematics data or one or more trajectories for trajectory validation.

At operation 204, example process 200 can include determining the mode (e.g., the selected mode of the perception component 110) is the first mode. The perception component 110 operating in the first mode can receive the planned trajectory that is generated by the primary system.

At operation 206, example process 200 can include storing the received trajectory (e.g., the planned trajectory). The perception component 110 can analyze the planned trajectory. The perception component 110 can analyze an object associated with the planned trajectory. The perception component 110 can determine an intersection probability associated with the object.

At operation 208, example process 200 can include determining the mode (e.g., the selected mode of the perception component 110) is the second mode. The perception component 110 operating in the second mode can receive more than one trajectory (e.g., more than one planned trajectory) that are generated by the primary system. The more than one planned trajectory can include a previous planned trajectory (e.g., the first trajectory (or "first planned trajectory")) and a current planned trajectory (e.g., the second trajectory (or "second planned trajectory")). The more than one trajectory can be managed and stored utilizing a queue in the perception component 110.

At operation 210, example process 200 can include storing the received trajectories (e.g., the first and second planned trajectories). The perception component 110 can analyze the planned trajectories. By way of example, the perception component 110 can analyze an object (e.g., a first object) associated with the first planned trajectory, and an object (e.g., a second object) associated with the second planned trajectory. In such an example, the perception component 110 can determine an intersection probability (e.g., a first intersection probability) associated with the first object, and an intersection probability (e.g., a second intersection probability) associated with the second object.

At operation 212, example process 200 can include determining the mode (e.g., the selected mode of the perception component 110) is the third mode. The perception component 110 operating in the third mode can determine to utilize kinematics and trajectory(ies) that are received for validation of the trajectory(ies).

At operation 214, example process 200 can include utilizing kinematics or trajectories for validation. The kinematics associated with the vehicle can be determined based on the received sensor data. The kinematics can be utilized along with the received trajectory(ies) for trajectory validation (validation of the trajectory(ies)).

At operation 216, example process 200 can include validating one or more trajectories. Trajectory(ies) being validated can include the trajectory(ies) generated and transmitted by the primary system. In some examples, the trajectory(ies) being validated can include the trajectory that is stored in the perception component 110, based on the perception component 110 being operated in the first mode. In other examples, the trajectory(ies) being validated can include the trajectories that are stored in the queue in the perception component 110, based on the perception component 110 being operated in the second mode. In other examples, the trajectory(ies) can be validated utilizing the kinematics of the vehicle. The validation based on the trajectory(ies) in any of the first-third modes can be performed based on a corridor or a subset of corridors associated with one or more of the trajectory(ies).

At operation 218, example process 200 can include transmitting a signal based on the validated trajectories. The perception component 110 can transmit, in the signal, results of the validating of the trajectory(ies). The signal can include data indicative of the individual ones of the trajectory(ies) evaluated with respect to the corridor or the subset of corridors, and/or data including individual ones of intersection probability(ies) determined by the perception component 110.

Although the perception component 110 can be operated in any of the first-third modes, as discussed above in the current disclosure, it is not limited as such. In some examples, the perception component 110 can be operated in a hybrid mode including a combination of the first mode and the third mode, or a combination of the second mode and the third mode.

Figure 3:
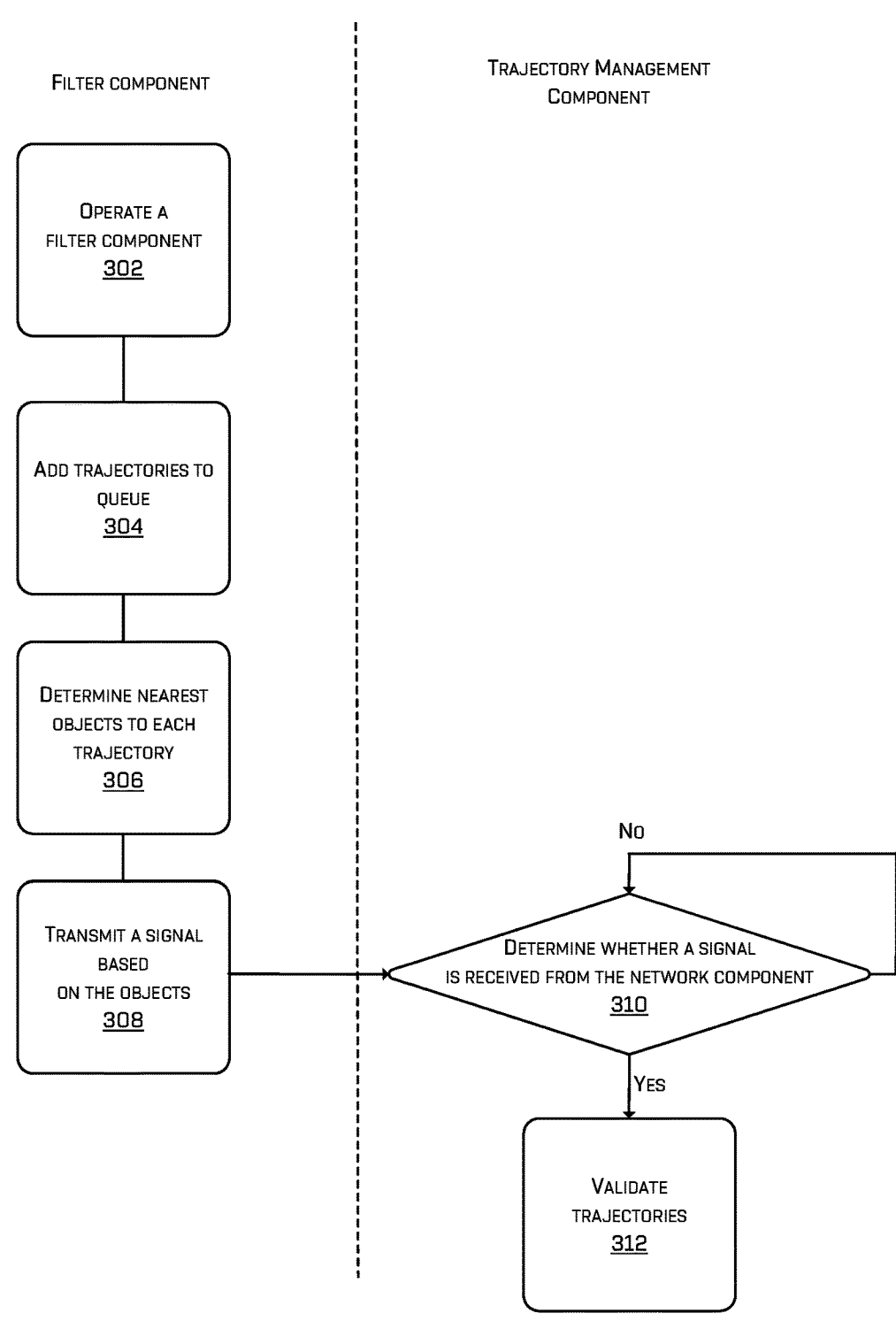
FIG. 3 is a flow diagram of an example process for operation of a filter component, in accordance with examples of the disclosure.

FIG. 3 is a flow diagram of an example process 300 for operation of a filter component, in accordance with examples of the disclosure. In some examples, example process 300 can be executed by at least a filter component (e.g., the filter component 112, as discussed above with reference to FIG. 1) and a trajectory management component (e.g., the trajectory management component 108, as discussed above with reference to FIG. 1).

At operation 302, example process 300 can include operating the filter component 112 to identify that the planned trajectory (e.g., the planned trajectory that is generated by the primary system) is received. The planned trajectory can be stored in the filter component 112. In some examples, the planned trajectory, which can be received as the current trajectory (e.g., the trajectory associated with a current frame of the primary system and/or the trajectory management component 108), can be stored in the filter component 112 along with one or more other trajectories).

At operation 304, example process 300 can include adding one or more trajectories to a queue in the filter component 112. In some examples, the planned trajectory (e.g., the current trajectory) can be added to the queue, in which one or more other trajectories (e.g., a previous planned trajectory) (e.g., the trajectory associated with a previous frame of the primary system and/or the trajectory management component 108) are stored.

At operation 306, example process 300 can include determining one or more nearest objects to each trajectory. Individual ones of the trajectory(ies) can be analyzed (e.g., validated) by the filter component 112 to filter out one or more objects. The nearest objects to each trajectory can be determined and utilized to filter out object(s) that are further from the trajectory than the nearest object(s). By way of example, the nearest object(s) to the current planned trajectory can be determined and utilized to filter out objects that are further from the current planned trajectory than the nearest object(s). Similarly, other nearest object(s) to the previous planned trajectory can be determined and utilized to filter out other objects that are further from the previous planned trajectory than the other nearest object(s).

By validating the trajectory(ies), the filter component 112 can be utilized to validate (e.g., compare data associated with the nearest object(s) to the vehicle) (e.g., perform simple physics based collision checking for the nearest object(s) to the vehicle) (e.g., perform a course collision check (e.g., a tribalistic course collision check)) each of the trajectory(ies) in the queue (e.g., a two-deep queue). The filter component 112 can operate (e.g., validate trajectory(ies)) based on an assumption of velocity (e.g., physics-based velocity determination, that velocity remains constant or within some bounds or thresholds, filtering out trajectories above or below velocity thresholds). In some examples, validating of the trajectory(ies) by the filter component 112 can include filtering out data associated with the corresponding trajectory(ies) based on the filter component 112 detecting no potential hazards associated with the data (e.g., object(s) identified by the data). By filtering out any data (e.g., data that would otherwise by utilized by the trajectory management component 108), the filter component 112 can reduce computational demands on the trajectory management component 108. As such, the trajectory management component 108 can more efficiently focus on data of a safety concern of a higher level than for the filtered out data.

At operation 308, example process 300 can include transmitting a signal based on the determined object(s) (e.g., the nearest object(s) and/or the object(s) that are filtered out). The signal can include results of the nearest object(s) and/or the object(s) that are filtered out, for individual ones of the trajectory(ies) stored in the queue. The signal can identify the nearest object(s) and/or the object(s) that are filtered out.

At operation 310, example process 300 can include determining, by the trajectory management component 108, whether a signal is received from the filter component 112. In some examples, the trajectory management component 108 can determine whether the signal generated by the filter component 112 is received. The trajectory management component 108 can proceed to operation 312 based on determining the signal from the filter component 112 is received. The trajectory management component 108 can refrain from proceeding to operation 312 based on determining the signal from the filter component 112 is not yet received (e.g., the trajectory management component 108 can, prior to moving to a next frame, wait for results from the filter component 112).

At operation 312, example process 300 can include validating one or more trajectories. The trajectory management component 108 can determine to validate the trajectory(ies) based on determining the signal from the filter component 112 is received. In some examples, the trajectory management component 108 can validate a trajectory (e.g., the current planned trajectory) and determine the trajectory is a selectable trajectory based on the nearest object(s) and/or the object(s) that are filtered out, for individual ones of the trajectory(ies) stored in the queue. In those examples, the trajectory can be determined as the selectable trajectory (e.g., a trajectory that can be selected) based on individual distances between corresponding one or more trajectories of the nearest object(s) and the vehicle trajectory meeting or exceeding a threshold distance. In other examples, the trajectory management component 108 can validate the trajectory (e.g., the current planned trajectory) and determine the trajectory is a non-selectable trajectory (e.g., a trajectory not to be selected) based on at least one of individual distances between corresponding one or more trajectories of the nearest object(s) and the vehicle trajectory being less than the threshold distance. Similar validation can be performed for any trajectory (e.g., the previous planned trajectory) as for the current planned trajectory.

Figure 4:
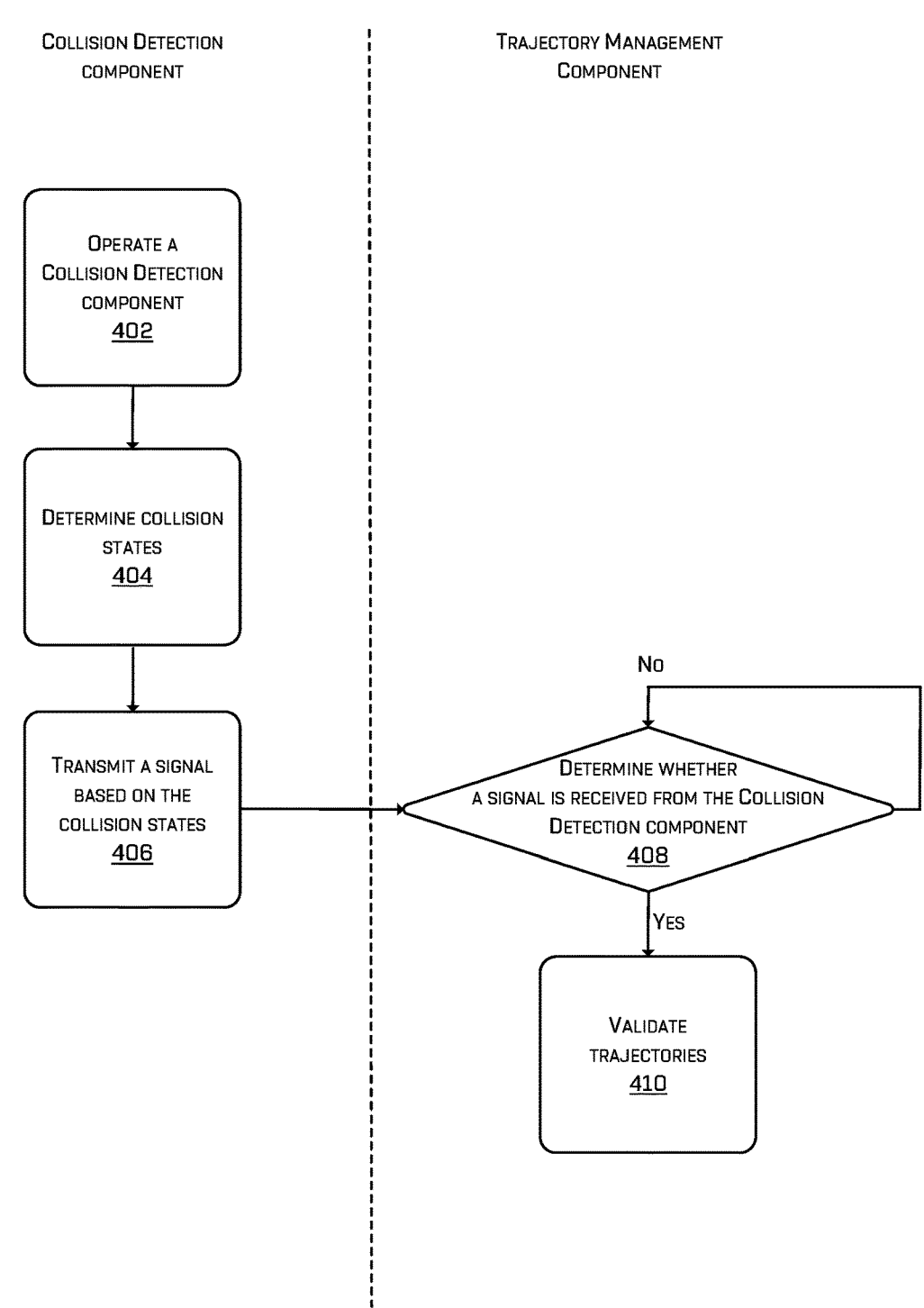
FIG. 4 is a flow diagram of an example process for operation of a collision detection component, in accordance with examples of the disclosure.

FIG. 4 is a flow diagram of an example process 400 for operation of a collision detection component, in accordance with examples of the disclosure. In some examples, example process 400 can be executed by at least a collision detection component (e.g., the collision detection component 114, as discussed above with reference to FIG. 1) and a trajectory management component (e.g., the trajectory management component 108, as discussed above with reference to FIG. 1).

At operation 402, example process 400 can include operating the collision detection component 114 to determine one or more trajectory are received, which can be utilized to determine one or more collision states. In some examples, the collision detection component 114 can perform collision checking (e.g., machine learned (ML) collision checking) to validate trajectory(ies). The trajectory(ies) that are received and/or validated can be trajectory(ies) that are generated by the primary system. In some examples with more than one trajectory being received by the collision detection component 114, the trajectories (e.g., a current planned trajectory and a previous planned trajectory) can be stored in a queue of the collision detection component 114.

At operation 404, example process 400 can include determining, by the collision detection component 114, one or more collision states based on the trajectory(ies). The collision state(s) can indicate likelihood(s) of collision based on the received trajectory(ies). By way of example, a collision state associated with the current planned trajectory can be determined based on individual distances between one or more object trajectories and the current planned trajectory. By way of example, in comparison to i) the perception component 110 being utilized to identify intersection probability(ies), but possibly, in some cases, not to determine collision state(s), the collision detection component 114 can determine collision states (e.g., ML collision states) based on the trajectory(ies) and/or the object(s).

At operation 406, example process 400 can include transmitting, by the collision detection component 114, a signal based on the collision state(s). The signal can include results of determining the collision state(s). In some examples, the signal can indicate, for individual ones of the trajectory(ies), whether the corresponding collision state meets or exceeds a threshold collision state.

At operation 408, example process 400 can include determining, by the trajectory management component 108, whether a signal is received from the collision detection component 114. In some examples, the trajectory management component 108 can determine whether the signal generated by the collision detection component 114 is received. The trajectory management component 108 can determine whether the collision state(s) meet or exceed the threshold collision state. The trajectory management component 108 can proceed to operation 410 based on determining the signal from the collision detection component 114 is received. The trajectory management component 108 can refrain from proceeding to operation 410 based on determining the signal from the collision detection component 114 is not yet received.

At operation 410, example process 400 can include validating one or more trajectories. The trajectory management component 108 can determine to validate the trajectory(ies) based on determining the signal from the collision detection component 114 is received. In some examples, the trajectory management component 108 can validate a trajectory (e.g., the current planned trajectory) and determine the trajectory is a selectable trajectory based on determining the collision state associated with the trajectory is less than the threshold collision state. In other examples, the trajectory management component 108 can validate the trajectory (e.g., the current planned trajectory) and determine the trajectory is a non-selectable trajectory based on determining the collision state associated with the trajectory meets or exceeds the threshold collision state. Similar validation can be performed for any trajectory (e.g., the previous planned trajectory) as for the current planned trajectory.

Figure 5:
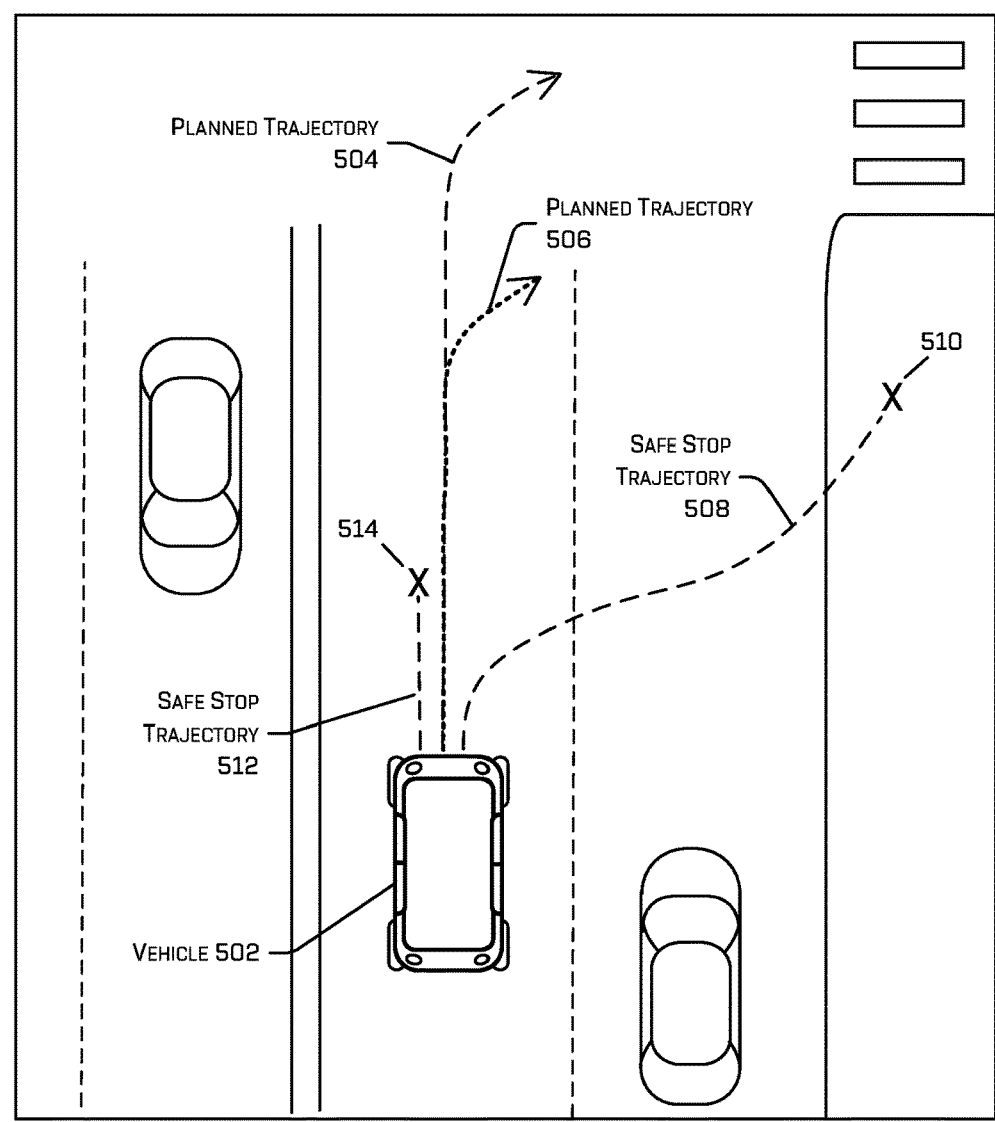
FIG. 5 shows an example driving environment illustrating a vehicle traversing the environment, and a number of candidate trajectories determined for the vehicle.

FIG. 5 shows an example driving environment 500 illustrating a vehicle traversing the environment, and trajectories determined for the vehicle. In some examples, the vehicle (e.g., the vehicle including the vehicle safety system 102, as discussed above with reference to FIG. 1) can utilize the trajectory management component 108 to receive and/or determine one or more trajectories. The trajectory(ies) can include a planned trajectory 504, which can be generated by a primary system of the vehicle 502. In some examples, the planned trajectory (e.g., current planned trajectory) 504 can be associated with a current frame.

The trajectory(ies) can include a planned trajectory 506, which can be generated by the primary system of the vehicle 502. In some examples, the planned trajectory (e.g., previous planned trajectory) 506 can be associated with a previous frame.

The trajectory(ies), which can be received by one or more components (e.g., the perception component 110, the filter component 112, and/or the collision detection component 114, as discussed above with reference to FIG. 1), can be stored in the perception component 110, the filter component 112, and/or the collision detection component 114. Individual ones of the perception component 110, the filter component 112, and the collision detection component 114 can include a queue to store the trajectory(ies) (e.g., the planned trajectory 504 and the planned trajectory 506), which can be received from a primary system (e.g., a primary system of the vehicle 502) and/or the trajectory management component 108.

The trajectory(ies) can include one or more safe stop trajectories. The safe stop trajectory(ies) can include a safe stop trajectory 508 (e.g., a first safe stop trajectory) associated with a stop location 510 (and/or associated with a first deceleration value), and a safe stop trajectory 512 (e.g., a second safe stop trajectory) associated with a stop location 514 (and/or associated with a second deceleration value that is different than the first deceleration value). Individual ones of the safe stop trajectory(ies) (e.g., the safe stop trajectory 508 and the safe stop trajectory 512), and/or individual ones of the stop location(s) (e.g., the stop location 510 and the stop location 514), can be determined by the trajectory management component 108.

The planned trajectories 504 and 506 can be determined based on various characteristics. In some examples, one or more characteristics (e.g., a direction (e.g., a first direction), a turning capability (e.g., a first turning capability) in the first direction, a velocity, a lateral acceleration limit, etc.) utilized to determine the planned trajectory 504 can be the same as, or different from, one or more characteristics (e.g., a direction (e.g., a second direction), a turning capability (e.g., a second turning capability) in the second direction, a velocity, a lateral acceleration limit, etc.) utilized to determine the planned trajectory 506.

In some examples, the trajectory management component 108 can determine whether to select the planned trajectory 504, the safe stop trajectory 508, or the safe stop trajectory 512, before or after receiving results from evaluating, by the perception component 110, the filter component 112, and/or the collision detection component 114, the planned trajectory 504. In other examples, the trajectory management component 108 can wait to receive results from the perception component 110, the filter component 112, and/or the collision detection component 114, the planned trajectory 504, of the evaluating, by the perception component 110, the filter component 112, and/or the collision detection component 114, of the planned trajectory 504. In those examples, the trajectory management component 108 can determine whether to select the planned trajectory 504, the safe stop trajectory 508, or the safe stop trajectory 512, based on one or more of the received results. In some examples, in other words, the trajectory management component 108 can operate without waiting to receive results from one or more of the perception component 110, the filter component 112, and/or the collision detection component 114, to proceed with its operations (e.g., determine whether to select the planned trajectory 504). By proceeding with its operations, the trajectory management component 108 can avoid any latency that would otherwise be incurred by waiting for results from one or more of the perception component 110, the filter component 112, and the collision detection component 114.

In some examples, for instance with the trajectory management component 108 receiving results from one or more of the perception component 110, the filter component 112, and the collision detection component 114, the trajectory management component 108 can operate based on determining one or more collision likelihoods associated with corresponding result(s) being higher than other likelihood(s) associated with other result(s). By way of example, the trajectory management component 108 can determine to change trajectories (e.g., to change from a planned trajectory to a safe-stop trajectory) by determining, based on result(s) from one or more of the perception component 110, the filter component 112, and the collision detection component 114 being associated with a higher likelihood of collision than for other result(s) from other component(s).

In some examples, the trajectory management component 108 can determine whether to select one of the current trajectory(ies) (e.g., the planned trajectory 504, the safe stop trajectory 508, or the safe stop trajectory 512), or whether to select a previous trajectory (e.g., the planned trajectory 506, or one or the safe stop trajectories determined at the previous frame), based on the results of the evaluating, by the perception component 110, the filter component 112, and/or the collision detection component 114, of one or more of the planned trajectory 504, the planned trajectory 506, and/or any of the safe stop trajectory(ies) determined therefor. In some examples, for instance with one or more of the perception component 110, the filter component 112, and/or the collision detection component 114 storing corresponding queue(s), the trajectory management component 108 is able to quickly perform trajectory selection since information can be received via the signals 116, 118, and 120 without delay. By way of example, in the event that there is a need to switch back to the previous trajectory, the previous trajectory can be stored in the corresponding queue(s) of the perception component 110, the filter component 112, and/or the collision detection component 114, to enable access to any information associated with the previous trajectory.

Although the safe stop trajectory 508 and the safe stop trajectory 512, as well as the stop location 510 and the stop location 514, respectively, can be determined by the vehicle 502 as discussed above in the current disclosure, it is not limited as such. In some examples, one or more other safe stop trajectories and corresponding other stop locations associated with the current planned trajectory 504 can be determined and stored in the trajectory management component 108. In those or other examples, one or more other safe stop trajectories and corresponding other stop locations associated with the previous planned trajectory 508 can be determined and stored (e.g., determined and/or stored at a previous frame) in the trajectory management component 108. The trajectory management component 108 can operate utilizing the other safe stop trajectories or the other stop locations in a similar way as for the safe stop trajectory 508 and the safe stop trajectory 512, as well as the stop location 510 and the stop location 514, respectively.

Although the planned trajectory 504 and the planned trajectory 506, can be determined by the vehicle 502 as discussed above in the current disclosure, it is not limited as such. In some examples, one or more other planned trajectories associated with any number of previous frames can be determined, and utilized by the trajectory management component 108 can the perception component 110, the filter component 112, and/or the collision detection component 114, in a similar way as for the planned trajectory 504 and the planned trajectory 506.

Figure 6:
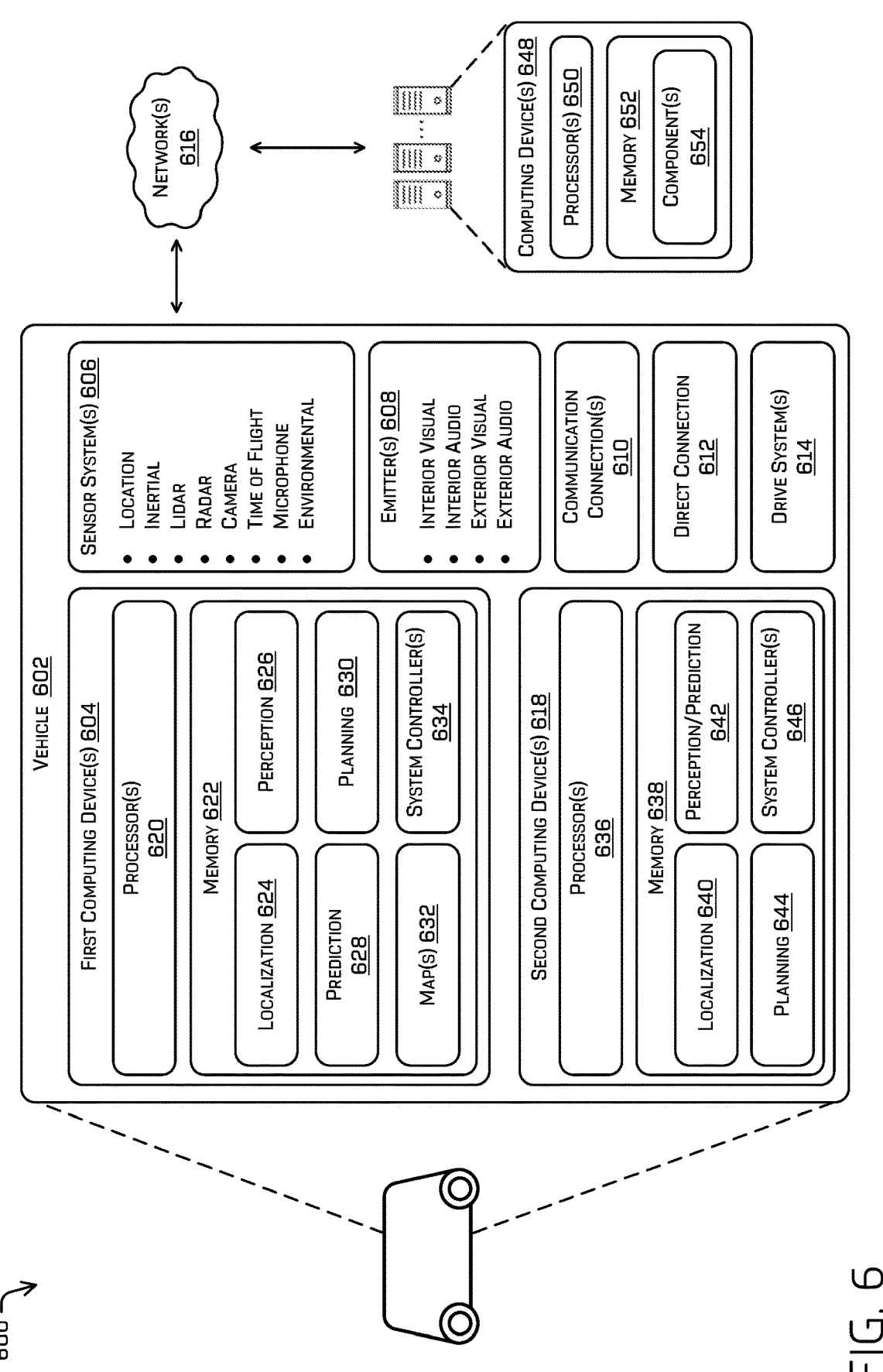
FIG. 6 is a block diagram of an example system for implementing the techniques described herein.

FIG. 6 is a block diagram of an example system 600 for implementing the techniques described herein. In at least one example, the system 600 can include a vehicle 602. In the illustrated example system 600, the vehicle 602 can be an autonomous vehicle; however, the vehicle 602 can be any other type of vehicle.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 602 can include one or more first computing devices 604, one or more sensor systems 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. By way of example, the first computing device(s) 604 may be considered to be a primary system. In some examples, the first computing device(s) 604 may be utilized to implement the primary system, as discussed above with reference to FIG. 1. The one or more sensor systems 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the first computing device(s) 604.

The vehicle 602 can also include emitter(s) 608 for emitting light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include communication connection(s) 610 that enable communication between the vehicle 602 and one or more other local or remote computing device(s) (e.g., a remote teleoperation computing device) or remote services. For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the first computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include the sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The vehicle 602 can include one or more second computing devices 618 to provide redundancy, error checking, and/or validation of determinations and/or commands determined by the first computing device(s) 604. By way of example, while the first computing device(s) 604 may be considered to be the primary system, the second computing device(s) 618 may be considered to be a secondary system. In some examples, the second computing device(s) 618 may be utilized to implement the vehicle safety system 102, as discussed above with reference to FIG. 1.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference and for all purposes.

The first computing device(s) 604 can include one or more processors 620 and memory 622 communicatively coupled with the one or more processors 620. In the illustrated example, the memory 622 of the first computing device(s) 604 stores a localization component 624, a perception component 626, a prediction component 628, a planning component 630, a maps component 632, and one or more system controllers 634. Though depicted as residing in the memory 622 for illustrative purposes, it is contemplated that the localization component 624, the perception component 626, the prediction component 628, the planning component 630, the maps component 632, and the one or more system controllers 634 can additionally, or alternatively, be accessible to the first computing device(s) 604 (e.g., stored in a different component of vehicle 602 and/or be accessible to the vehicle 602 (e.g., stored remotely).

In memory 622 of the first computing device 604, the localization component 624 can include functionality to receive data from the sensor system(s) 606 to determine a position of the vehicle 602. For example, the localization component 624 can include and/or request/receive a three-dimensional map of an environment and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 626 can use perception algorithms to determine a perception-based bounding box associated with an object in the environment based on sensor data. For example, the perception component 626 can receive image data and classify the image data to determine that an object is represented in the image data. Then, using detection algorithms, the perception component 626 can generate a two-dimensional bounding box and/or a perception-based three-dimensional bounding box associated with the object. The perception component 626 can further generate a three-dimensional bounding box associated with the object. As discussed above, the three-dimensional bounding box can provide additional information such as a location, orientation, pose, and/or size (e.g., length, width, height, etc.) associated with the object.

The perception component 626 can include functionality to store perception data generated by the perception component 626. In some instances, the perception component 626 can determine a track corresponding to an object that has been classified as an object type. For purposes of illustration only, the perception component 626, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 602. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 628 can generate one or more probability maps representing prediction probabilities of possible locations of one or more objects in an environment. For example, the prediction component 628 can generate one or more probability maps for vehicles, pedestrians, animals, and the like within a threshold distance from the vehicle 602. In some instances, the prediction component 628 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 630 can determine a path for the vehicle 602 to follow to traverse through an environment. For example, the planning component 630 can determine various routes and paths and various levels of detail. In some instances, the planning component 630 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 630 can generate an instruction for guiding the autonomous vehicle along at least a portion of the route from the first location to the second location. In at least one example, the planning component 630 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 630 can alternatively, or additionally, use data from the perception component 626 and/or the prediction component 628 to determine a path for the vehicle 602 to follow to traverse through an environment. For example, the planning component 630 can receive data from the perception component 626 and/or the prediction component 628 regarding objects associated with an environment. Using this data, the planning component 630 can determine a route to travel from a first location (e.g., a current location) to a second location (e.g., a target location) to avoid objects in an environment. In at least some examples, such a planning component 630 may determine there is no such collision free path and, in turn, provide a path which brings vehicle 602 to a safe stop avoiding all collisions and/or otherwise mitigating damage.

The memory 622 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the map(s) 632. That is, the map(s) 632 can be used in connection with the localization component 624, the perception component 626, the prediction component 628, and/or the planning component 630 to determine a location of the vehicle 602, identify objects in an environment, generate prediction probabilit(ies) associated with objects and/or the vehicle 602, and/or generate routes and/or trajectories to navigate within an environment.

In some examples, the one or more maps 632 can be stored on a remote computing device(s) (such as the computing device(s) 648) accessible via network(s) 616. In some examples, multiple maps 632 can be stored based on, for example, a characteristic (e.g., type of entity, time of day, day of week, season of the year, etc.). Storing multiple maps 632 can have similar memory requirements but can increase the speed at which data in a map can be accessed.

In at least one example, the first computing device(s) 604 can include one or more system controller(s) 634, which can be configured to control steering, propulsion, braking, safety, emitters, communication, and other systems of the vehicle 602. These system controller(s) 634 can communicate with and/or control corresponding systems of the drive system(s) 614 and/or other components of the vehicle 602, which may be configured to operate in accordance with a path provided from the planning component 630.

The second computing device(s) 618 can comprise one or more processors 636 and memory 638 including components to verify and/or control aspects of the vehicle 602, as discussed herein. In at least one instance, the one or more processors 636 can be similar to the processor(s) 620 and the memory 638 can be similar to the memory 622. However, in some examples, the processor(s) 636 and the memory 638 may comprise different hardware than the processor(s) 620 and the memory 622 for additional redundancy.

In some examples, the memory 638 can comprise a localization component 640, a perception/prediction component 642, a planning component 644, and one or more system controllers 646. In some examples, the perception/prediction component 642 can be utilized to implement any features of the perception component 110, as discussed above with reference to FIG. 1.

In some examples, the localization component 640 may receive sensor data from the sensor(s) 606 to determine one or more of a position and/or orientation (together a pose) of the autonomous vehicle 602. Here, the position and/or orientation may be relative to point(s) and/or object(s) in an environment in which the autonomous vehicle 602 is located. In examples, the orientation may include an indication of a yaw, roll, and/or pitch of the autonomous vehicle 602 relative to a reference plane and/or relative to point(s) and/or object(s). In examples, the localization component 640 may perform less processing than the localization component 624 of the first computing device(s) 604 (e.g., higher-level localization). For instance, the localization component 640 may not determine a pose of the autonomous vehicle 602 relative to a map, but merely determine a pose of the autonomous vehicle 602 relative to objects and/or surfaces that are detected around the autonomous vehicle 602 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 642 can include functionality to detect, identify, classify, and/or track object(s) represented in sensor data. For example, the perception/prediction component 642 can perform the clustering operations and operations to estimate or determine a height associated with objects, as discussed herein.

In some examples, the perception/prediction component 642 may comprise an M-estimator, but may lack an object classifier such as, for example, a neural network, decision tree, and/or the like for classifying objects. In additional or alternate examples, the perception/prediction component 642 may comprise an ML model of any type, configured to disambiguate classifications of objects. By contrast, the perception component 626 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 642 (and/or 626) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 642 may also process the input data to determine one or more predicted trajectories for an object. For example, based on a current position of an object and a velocity of the object over a period of a few seconds, the perception/prediction component 642 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 644 can include functionality to receive a trajectory from the planning component 630 to validate that the trajectory is free of collisions and/or is within safety margins. In some examples, the planning component 644 can generate a safe stop trajectory (e.g., a trajectory to stop the vehicle 602 with a "comfortable" deacceleration (e.g., less than maximum deceleration)) and in some examples the planning component 644 can generate an emergency stop trajectory (e.g., maximum deceleration with or without steering inputs).

In some examples, the planning component 644 can include the trajectory management component 108, the perception component 110, the filter component 112, and/or the collision detection component 114. In some examples, any of the corresponding queue(s) of the perception component 110, the filter component 112, and/or the collision detection component 114 as discussed throughout this disclosure can be the same as, or different from, any of the other queue(s). In those examples, the perception component 110, the filter component 112, and/or the collision detection component 114 can share information with each other, and/or with the trajectory management component 108.

In some examples, the perception component 110, the filter component 112, and/or the collision detection component 114 can be stored and/or managed by the planning component 644 as discussed above with reference to FIGS. 1-5. By way of example, the perception component 110 can generate a signal indicative of an object proximate the autonomous vehicle; the filter component 112 can filer out object(s), and generate a second signal indicative of a physics based collision state associated with any object(s) not filtered out; the collision detection component 114 can generate a third signal indicative of a machine learned based collision state, and determine a likelihood of collision based at least in part on the machine learned (ML) based collision state; and the trajectory management component 108 can determine to follow the candidate trajectory or the a safe stop trajectory based on at least one of the first signal, the second signal, or the third signal.

In some examples, the system controller(s) 646 can include functionality to control safety critical components (e.g., steering, braking, motors, etc.) of the vehicle. In this manner, the second computing device(s) 618 can provide redundancy and/or an additional hardware and software layer for vehicle safety.

The vehicle 602 can connect to computing device(s) 648 via the network 616 and can include one or more processors 650 and memory 652 communicatively coupled with the one or more processors 650. In at least one instance, the one or more processors 650 can be similar to the processor(s) 620 and the memory 652 can be similar to the memory 622. In the illustrated example, the memory 652 of the computing device(s) 648 stores a component(s) 654, which may correspond to any of the components discussed herein.

The processor(s) 620, 636, and/or 650 can be any suitable processor capable of executing instructions to process data and perform operations as described herein. By way of example and not limitation, the processor(s) 620, 636, and/or 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622, 638, and/or 652 are examples of non-transitory computer-readable media. The memory 622, 638, and/or 652 can store an operating system and one or more software applications, instructions, programs, and/or data to implement the methods described herein and the functions attributed to the various systems. In various implementations, the memory 622, 638, and/or 652 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 622, 638, and/or 652 can be implemented as a neural network. In some examples, the components in the memory 622, 638, and/or 652 may not include machine learning algorithm to reduce complexity and to be verified and/or certified from a safety standpoint.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

FIG. 7 depicts an example process for operation of a vehicle safety system. In some examples, example process 700 can be executed by at least a vehicle safety system (e.g., the vehicle safety system 102, as discussed above with reference to FIG. 1).

At operation 702, example process 700 can include receiving a trajectory (e.g., a candidate trajectory). The candidate trajectory can be received, at a first component (e.g., the trajectory management component 108) of a vehicle (e.g., an autonomous vehicle), for the vehicle to follow.

At operation 704, example process 700 can include receiving at least one of a first signal (e.g., the signal 116) indicative of an object proximate the vehicle, a second signal (e.g., the signal 118) indicative of a physics based collision state, or a third signal (e.g., the signal 120) indicative of machine learned (ML) based collision state. The signal 116 can be received by the trajectory management component 108 and from a second component (e.g., the perception component 110). The signal 118 can be received by the trajectory management component 108 and from a third component (e.g., the filter component 112). The signal 120 can be received by the trajectory management component 108 and from a fourth component (e.g., the collision detection component 114). In some examples, one or more of the perception component 110, the filter component 112, the collision detection component 114, and the trajectory management component 108 can be integrated together, and/or can share results with one another.

At operation 706, example process 700 can include determining whether the at least one of the signal 116, the signal 118, or the signal 120 is received. The example process 700 can proceed to operation 702 based on determining the at least one of the signal 116, the signal 118, or the third signal is not received by the trajectory management component 108. The example process 700 can proceed to operation 708 based on determining the at least one of the signal 116, the signal 118, or the signal 120 is received by the trajectory management component 108.

At operation 708, example process 700 can include determining to follow the candidate trajectory or the safe stop trajectory. The trajectory management component 108 can determine to follow the candidate trajectory or the safe stop trajectory based on the at least one of the signal 116, the signal 118, or the signal 120. In some examples, the trajectory management component 108 can determine to follow the candidate trajectory or the safe stop trajectory, prior to after receiving the at least one of the signal 116, the signal 118, or the signal 120. In other examples, the trajectory management component 108 can wait for the at least one of the signal 116, the signal 118, or the signal 120 prior to determining to follow the candidate trajectory or the safe stop trajectory.

Example Clauses

A: A method comprising: receiving a candidate trajectory for an autonomous vehicle to follow; generating a first signal indicative of an object proximate the autonomous vehicle; generating a second signal indicative of a physics based collision state, and determining a first likelihood of collision based at least in part on the physics based collision state; generating a third signal indicative of a machine learned based collision state, and determining a second likelihood of collision based at least in part on the machine learned (ML) based collision state; and determining to follow the candidate trajectory or a safe stop trajectory based at least in part on at least one of the first signal, the second signal, or the third signal.

B: The method of paragraph A, wherein determining to follow the candidate trajectory or the safe stop trajectory comprises waiting until the first signal, the second signal, and third signal are generated.

C: The method of paragraph A or B, wherein determining to follow the candidate trajectory or the safe stop trajectory further comprises: determining that the first likelihood of collision is lower than the second likelihood of collision; and determining to follow the safe stop trajectory based at least in part on the second likelihood of collision.

D: The method of any of paragraphs A-C, wherein a component receiving the at least one of the first signal, the second signal, or the third signal performs a collision check by perturbing a simulation of a second object along at least one of an acceleration or a steering angle associated with the second object.

E: The method of any of paragraphs A-D, wherein the object is a first object, and generating the first signal further comprises: identifying a second object proximate to the autonomous vehicle; identifying the first object as being nearer to the candidate trajectory than the second object; and generating the first signal based on the first object being nearer to the candidate trajectory than the second object, wherein generating the second signal further comprises: identifying the physics based collision state based at least in part on a third object proximate the candidate trajectory; and filtering out a fourth object based at least in part on an object trajectory of the fourth object not being associated with a potential intersection with a candidate trajectory, and wherein generating the third signal further comprises: determining that the ML based collision state meets or exceeds a threshold collision state based at least in part on a predicted distance between a fifth object and the autonomous vehicle being less than a threshold distance.

F: One or more non-transitory computer-readable media storing instructions that, when executed, cause one or more processors to perform operations comprising: receiving a candidate trajectory for a vehicle to follow; receiving a first signal indicative of an object proximate the vehicle; receiving a second signal indicative of a physics based collision state, the second signal indicating a first likelihood of collision determined based at least in part on the physics based collision state; or receiving a third signal indicative of a machine learned (ML) based collision state, the third signal indicating a second likelihood of collision determined based at least in part on the ML based collision state; and determining to follow the candidate trajectory or a safe stop trajectory based at least in part on at least one of the first signal, the second signal, or the third signal.

G: The one or more non-transitory computer-readable media of paragraph F, wherein determining to follow the candidate trajectory or the safe stop trajectory further comprises: waiting until the first signal, the second signal, and the third signal are received.

H: The one or more non-transitory computer-readable media of paragraph F or G, wherein determining to follow the candidate trajectory or the safe stop trajectory further comprises: determining that the first likelihood of collision is lower than the second likelihood of collision; and determining to follow the safe stop trajectory based at least in part on the second likelihood of collision.

I: The one or more non-transitory computer-readable media of any of paragraphs F-H, wherein a first component receiving the at least one of the first signal, the second signal, or the third signal performs a collision check at a higher level of precision than a second component generating the second signal, and a third component generating the third signal.

J: The one or more non-transitory computer-readable media of any of paragraphs F-I, wherein: the first signal is generated by a first component; the first component is configured to store the candidate trajectory and a previous candidate trajectory in a queue; and determining to follow the candidate trajectory is performed by a second component based at least in part on the first signal being received by the second component.

K: The one or more non-transitory computer-readable media of any of paragraphs F-J, wherein: the object is a first object; generating the second signal is based at least in part on determining that a second object associated with the candidate trajectory is nearer to the candidate trajectory than a third object associated with candidate trajectory; and the physics based collision state is determined based at least in part on the second object.

L: The one or more non-transitory computer-readable media of any of paragraphs F-K, wherein the first signal is determined based at least in part on kinematics data associated with the vehicle.

M: A system comprising: one or more processors; and one or more non-transitory computer-readable media storing instructions executable by the one or more processors, wherein the instructions, when executed, cause the system to perform operations comprising: receiving a candidate trajectory for a vehicle to follow; receiving at least one of: a first signal indicative of an object proximate the vehicle; a second signal indicative of a physics based collision state, the second signal indicating a first likelihood of collision determined based at least in part on the physics based collision state; or a third signal indicative of a machine learned (ML) based collision state, the third signal indicating a second likelihood of collision based at least in part on the ML based collision state; and determining to follow the candidate trajectory or a safe stop trajectory based at least in part on at least one of the first signal, the second signal, or the third signal.

N: The system of paragraph M, the operations further comprising: receiving the second signal and the third signal, wherein determining to follow the candidate trajectory or the safe stop trajectory further comprises: determining that a first likelihood of collision based at least in part on the ML based collision state is lower than a second likelihood of collision based at least in part on the physics based collision state; and determining to follow the safe stop trajectory based at least in part on the second likelihood of collision.

O: The system of paragraph M or N, the operations further comprising: identifying a second object and a third object associated with the candidate trajectory; and identifying that the second object is a nearest object to the candidate trajectory, wherein generating the second signal is based at least in part on the second object.

P: The system of any of paragraphs M-O, wherein the first signal is determined based at least in part on kinematics data associated with the vehicle.

Q: The system of any of paragraphs M-P, wherein determining to follow the candidate trajectory or the safe stop candidate trajectory comprises waiting until at least the third signal is received.

R: The system of any of paragraphs M-Q, wherein: the first signal is generated by a first component; the first component is configured to store the candidate trajectory and a previous candidate trajectory in a queue; and determining to follow the candidate trajectory is performed by a second component based at least in part on the first signal being received by the second component.

S: The system of any of paragraphs M-R, wherein a component receiving the at least one of the first signal, the second signal, or the third signal performs a collision check by perturbing a simulation of a second object along at least one of an acceleration or a steering angle associated with the second object.

T: The system of any of paragraphs M-S, wherein the physics based collision state is identified based at least in part on a nearest object to the candidate trajectory.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method for an autonomous vehicle with a vehicle safety system, the method comprising:

receiving a candidate trajectory for the autonomous vehicle to follow;

adding the candidate trajectory into a queue in which one or more other trajectories are stored;

receiving a set of object detections associated with a set of objects proximate to the autonomous vehicle;

determining, based at least in part on the queue, that an object of the set of objects does not meet or exceed a threshold likelihood of interacting with the autonomous vehicle;

removing an object detection associated with the object from the set of object detections, leaving a subset of object detections;

determining, from among the subset of object detections, a nearest object to the candidate trajectory in the queue;

generating a first signal indicative of a first object that is proximate to the autonomous vehicle and is the nearest object to the candidate trajectory among trajectories stored in the queue, wherein generating the first signal further comprises:

identifying a second object proximate to the autonomous vehicle;

identifying the first object as being nearer to the candidate trajectory than the second object; and generating the first signal based on the first object being nearer to the candidate trajectory than the second object;

generating, based on the candidate trajectory, a second signal indicative of a physics based collision state, wherein generating the second signal further comprises:

identifying the physics based collision state based at least in part on a third object proximate to the candidate trajectory; and filtering out a fourth object based at least in part on an object trajectory of the fourth object not being associated with a potential intersection with the candidate trajectory;

determining a first likelihood of collision between the nearest object and the autonomous vehicle following the candidate trajectory based at least in part on the physics based collision state;

generating, based on the candidate trajectory, a third signal indicative of a machine learned (ML) based collision state associated with the autonomous vehicle following the candidate trajectory, wherein generating the third signal further comprises:

determining that the ML based collision state meets or exceeds a threshold collision state based at least in part on a predicted distance between a fifth object and the autonomous vehicle being less than a threshold distance;

determining a second likelihood of collision between the nearest object and the autonomous vehicle following the candidate trajectory based at least in part on the ML based collision state;

validating the candidate trajectory and a safe stop trajectory based at least in part on the generating of the first signal, the second signal, the third signal, and a corridor associated with the candidate trajectory, wherein the corridor is determined based at least in part on the candidate trajectory and kinematics of the autonomous vehicle;

determining to follow the candidate trajectory or the safe stop trajectory based at least in part on the validating of the candidate trajectory and the safe stop trajectory; and outputting the candidate trajectory or the safe stop trajectory to a drive system controller that controls the autonomous vehicle to traverse along the candidate trajectory or the safe stop trajectory in response to the validating of the candidate trajectory and the safe stop trajectory, and the determining to follow the candidate trajectory or the safe stop trajectory.

2. The method of claim 1, wherein determining to follow the candidate trajectory or the safe stop trajectory further comprises waiting until the first signal, the second signal, and the third signal are generated.

3. The method of claim 1, wherein determining to follow the candidate trajectory or the safe stop trajectory further comprises:

determining that the first likelihood of collision is lower than the second likelihood of collision; and determining to follow the safe stop trajectory based at least in part on the second likelihood of collision.

4. The method of claim 1, wherein a component receiving at least one of the first signal, the second signal, or the third signal performs a collision check by perturbing a simulation of a sixth object along at least one of an acceleration or a steering angle associated with the sixth object.

5. One or more non-transitory computer-readable media for an autonomous vehicle with a vehicle safety system, the one or more non-transitory computer-readable media storing instructions that, when executed, cause one or more processors to perform operations comprising:

receiving a candidate trajectory for the autonomous vehicle to follow;

adding the candidate trajectory into a queue in which one or more other trajectories are stored;

receiving a set of object detections associated with a set of objects proximate to the autonomous vehicle;

determining, based at least in part on the queue, that an object of the set of objects does not meet or exceed a threshold likelihood of interacting with the autonomous vehicle;

removing an object detection associated with the object from the set of object detections, leaving a subset of object detections;

determining, from among the subset of object detections, a nearest object to the candidate trajectory in the queue;

receiving a first signal indicative of a first object that is proximate to the autonomous vehicle and is the nearest object to the candidate trajectory among trajectories stored in the queue, wherein the first signal is received after:

identifying a second object proximate to the autonomous vehicle;

identifying the first object as being nearer to the candidate trajectory than the second object; and generating the first signal based on the first object being nearer to the candidate trajectory than the second object;

receiving a second signal indicative of a physics based collision state, the second signal indicating a first likelihood of collision determined based at least in part on the physics based collision state, wherein the second signal is received after:

identifying the physics based collision state based at least in part on a third object proximate to the candidate trajectory; and filtering out a fourth object based at least in part on an object trajectory of the fourth object not being associated with a potential intersection with the candidate trajectory;

receiving a third signal indicative of a machine learned (ML) based collision state, the third signal indicating a second likelihood of collision determined based at least in part on the ML based collision state, wherein the third signal is received after:

determining that the ML based collision state meets or exceeds a threshold collision state based at least in part on a predicted distance between a fifth object and the autonomous vehicle being less than a threshold distance;

validating the candidate trajectory and a safe stop trajectory based at least in part on the receiving of the first signal, the second signal, and the third signal;

determining to follow the candidate trajectory or the safe stop trajectory based at least in part on the validating of the candidate trajectory and the safe stop trajectory; and outputting the candidate trajectory or the safe stop trajectory to a drive system controller that controls the autonomous vehicle to traverse along the candidate trajectory or the safe stop trajectory in response to the validating of the candidate trajectory and the safe stop trajectory, and the determining to follow the candidate trajectory or the safe stop trajectory.

6. The one or more non-transitory computer-readable media of claim 5, wherein determining to follow the candidate trajectory or the safe stop trajectory further comprises:

waiting until the first signal, the second signal, and the third signal are received.

7. The one or more non-transitory computer-readable media of claim 5, wherein determining to follow the candidate trajectory or the safe stop trajectory further comprises:

determining that the first likelihood of collision is lower than the second likelihood of collision; and determining to follow the safe stop trajectory based at least in part on the second likelihood of collision.

8. The one or more non-transitory computer-readable media of claim 5, wherein a first component receiving at least one of the first signal, the second signal, or the third signal performs a collision check at a higher level of precision than a second component generating the second signal, and a third component generating the third signal.

9. The one or more non-transitory computer-readable media of claim 5, wherein:

the first signal is generated by a first component;

the first component is configured to store the candidate trajectory and a previous candidate trajectory in the queue; and determining to follow the candidate trajectory is performed by a second component based at least in part on the first signal being received by the second component.

10. The one or more non-transitory computer-readable media of claim 5, wherein the first signal is determined based at least in part on kinematics data associated with the autonomous vehicle.

11. A system for an autonomous vehicle with a vehicle safety system, the system comprising:

one or more processors; and one or more non-transitory computer-readable media storing instructions executable by the one or more processors, wherein the instructions, when executed, cause the system to perform operations comprising:

receiving a candidate trajectory for the autonomous vehicle to follow;

adding the candidate trajectory into a queue in which one or more other trajectories are stored;

receiving a set of object detections associated with a set of objects proximate to the autonomous vehicle;

determining, based at least in part on the queue, that an object of the set of objects does not meet or exceed a threshold likelihood of interacting with the autonomous vehicle;

removing an object detection associated with the object from the set of object detections, leaving a subset of object detections;

determining, from among the subset of object detections, a nearest object to the candidate trajectory in the queue;

receiving:

a first signal indicative of a first object that is proximate to the autonomous vehicle and is the nearest object to the candidate trajectory among trajectories stored in the queue, wherein the first signal is received after:

identifying a second object proximate to the autonomous vehicle;

identifying the first object as being nearer to the candidate trajectory than the second object; and generating the first signal based on the first object being nearer to the candidate trajectory than the second object;

a second signal indicative of a physics based collision state, the second signal indicating a first likelihood of collision determined based at least in part on the physics based collision state, wherein the second signal is received after:

identifying the physics based collision state based at least in part on a third object proximate to the candidate trajectory; and filtering out a fourth object based at least in part on an object trajectory of the fourth object not being associated with a potential intersection with the candidate trajectory; and a third signal indicative of a machine learned (ML) based collision state, the third signal indicating a second likelihood of collision based at least in part on the ML based collision state, wherein the third signal is received after:

determining that the ML based collision state meets or exceeds a threshold collision state based at least in part on a predicted distance between a fifth object and the autonomous vehicle being less than a threshold distance;

validating the candidate trajectory and a safe stop trajectory based at least in part on the receiving of the first signal, the second signal, and the third signal;

determining to follow the candidate trajectory or the safe stop trajectory based at least in part on the validating of the candidate trajectory and the safe stop trajectory; and outputting the candidate trajectory or the safe stop trajectory to a drive system controller that controls the autonomous vehicle to traverse along the candidate trajectory or the safe stop trajectory in response to the validating of the candidate trajectory and the safe stop trajectory, and the determining to follow the candidate trajectory or the safe stop trajectory.

12. The system of claim 11, wherein determining to follow the candidate trajectory or the safe stop trajectory further comprises:

determining that the first likelihood of collision based at least in part on the ML based collision state is lower than the second likelihood of collision based at least in part on the physics based collision state; and determining to follow the safe stop trajectory based at least in part on the second likelihood of collision.

13. The system of claim 11, wherein the first signal is determined based at least in part on kinematics data associated with the autonomous vehicle.

14. The system of claim 11, wherein determining to follow the candidate trajectory or the safe stop trajectory comprises waiting until at least the third signal is received.

15. The system of claim 11, wherein:

the first signal is generated by a first component;

the first component is configured to store the candidate trajectory and a previous candidate trajectory in the queue; and determining to follow the candidate trajectory is performed by a second component based at least in part on the first signal being received by the second component.

16. The system of claim 11, wherein a component receiving the at least one of the first signal, the second signal, or the third signal performs a collision check by perturbing a simulation of a sixth object along at least one of an acceleration or a steering angle associated with the sixth object.

17. The system of claim 11, wherein the physics based collision state is identified based at least in part on the nearest object to the candidate trajectory.

* * * * *